United States Patent
Dudar et al.

(10) Patent No.: US 9,732,706 B2
(45) Date of Patent: Aug. 15, 2017

(54) SYSTEM AND METHODS FOR REGULATING FUEL VAPOR FLOW IN A FUEL VAPOR RECIRCULATION LINE

(71) Applicant: Ford Global Technologies, LLC, Dearborn, MI (US)

(72) Inventors: Aed M. Dudar, Canton, MI (US); Dennis Seung-Man Yang, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 14/825,067

(22) Filed: Aug. 12, 2015

(65) Prior Publication Data

US 2017/0045019 A1    Feb. 16, 2017

(51) Int. Cl.
*F02M 25/08* (2006.01)
*F02D 41/00* (2006.01)
*B60K 15/035* (2006.01)
*F02D 41/04* (2006.01)
*B60K 15/03* (2006.01)

(52) U.S. Cl.
CPC ... *F02M 25/0836* (2013.01); *B60K 15/03519* (2013.01); *F02D 41/003* (2013.01); *F02M 25/089* (2013.01); *F02M 25/0854* (2013.01); *B60K 2015/0321* (2013.01); *F02D 41/042* (2013.01)

(58) Field of Classification Search
CPC .. F02M 25/08; F02M 25/089; F02M 25/0836; F02M 25/0854; F02D 41/00; F02D 41/14; F02D 41/003; F02D 41/042; B60K 15/03; B60K 15/03519
See application file for complete search history.

(56) References Cited

U.S. PATENT DOCUMENTS

| | | | | |
|---|---|---|---|---|
| 4,208,997 A | * | 6/1980 | Yoshida | F02M 25/089 123/519 |
| 4,275,696 A | * | 6/1981 | Yoshida | F02M 25/089 123/519 |
| 5,081,847 A | | 1/1992 | Anderson, Jr. | |

(Continued)

OTHER PUBLICATIONS

Dudar, Aed M., "System and Methods for Preventing Hydrocarbon Breakthrough Emissions," U.S. Appl. No. 14/860,421, filed Sep. 21, 2015, 51 pages.

(Continued)

*Primary Examiner* — Hieu T Vo
(74) *Attorney, Agent, or Firm* — James Dottavio; McCoy Russell LLP

(57) ABSTRACT

Methods and systems are provided for regulating the flow of fuel vapors exiting a fuel tank. In one example, a method for an engine may include adjusting an amount of fuel vapors flowing through a fuel vapor recirculation line, where the recirculation line may be coupled on a first end to a fuel tank and on an opposite second end to a fuel fill inlet. The valve may be adjusted to a more open position to increase fuel vapor flow through the recirculation line in response to increases in hydrocarbon emissions from a fuel vapor canister, and to a more closed position to reduce fuel vapor flow through the recirculation line in response to increases in hydrocarbon emissions from the fuel fill inlet.

20 Claims, 4 Drawing Sheets

(56) References Cited

U.S. PATENT DOCUMENTS

| | | | |
|---|---|---|---|
| 5,462,100 | A | 10/1995 | Covert et al. |
| 5,782,275 | A | 7/1998 | Hartsell, Jr. et al. |
| 6,103,080 | A | 8/2000 | Pham et al. |
| 6,182,457 | B1 | 2/2001 | Enderle |
| 6,854,492 | B2 | 2/2005 | Benjey |
| 7,055,556 | B2 | 6/2006 | Benjey et al. |
| 7,243,678 | B2 | 7/2007 | Banerjee et al. |
| 7,424,885 | B2 | 9/2008 | Everingham et al. |
| 8,181,631 | B2 | 5/2012 | Bohr et al. |
| 2001/0025668 | A1 | 10/2001 | Enge |
| 2003/0056837 | A1 | 3/2003 | Benjey |
| 2003/0140970 | A1 | 7/2003 | Benjey |
| 2005/0016505 | A1 | 1/2005 | Everingham et al. |
| 2013/0152905 | A1 | 6/2013 | Woods et al. |
| 2015/0083088 | A1 | 3/2015 | Pearce et al. |
| 2015/0369150 | A1* | 12/2015 | Dudar ................ F02M 25/0836 123/519 |
| 2016/0290286 | A1* | 10/2016 | Dudar ................ F02M 25/0836 |

OTHER PUBLICATIONS

Dudar, Aed M., "Systems and Methods for Limited Emissions Refueling," U.S. Appl. No. 15/013,720, filed Feb. 2, 2016, 40 pages.
Dudar, A. et al., "Systems and Methods for Inferring Fuel Vapor Canister Loading Rate, " U.S. Appl. No. 14/606,704, filed Jan. 27, 2015, 43 pages.
Dudar, A., "Evap System with Valve to Improve Canister Purging, " U.S. Appl. No. 14/794,474, filed Jul. 8, 2015, 63 pages.

* cited by examiner

SYSTEM AND METHODS FOR REGULATING FUEL VAPOR FLOW IN A FUEL VAPOR RECIRCULATION LINE

FIELD

The present disclosure relates to an evaporative emission control (EVAP) system in a vehicle system.

BACKGROUND/SUMMARY

Vehicle emission control systems may be configured to store fuel vapors from fuel tank refueling and diurnal engine operations, and then purge the stored vapors during a subsequent engine operation. The fuel vapors may be stored in a fuel vapor canister coupled to the fuel tank which contains adsorbent material, such as activated carbon, capable of adsorbing hydrocarbon fuel vapor.

The fuel tank may be further coupled to a vapor recovery line (vapor recirculation line). The vapor recovery line may be configured to circulate and/or hold a percentage of refueling vapors, thus limiting the rate of fuel vapor canister loading. Fuel vapors may recirculate back to the fuel tank by flowing through the recirculation line, and then through a filler neck of the fuel tank. Further, depending on the fuel dispenser, the fuel vapors within the vapor recovery line may be returned to the fuel dispenser, thus limiting the total fuel vapor stored within the fuel vapor canister for a given refueling event. Fuel vapor recirculation lines include orifices to regulate the fuel vapor flow rate through the recirculation line.

However, as the orifices age, flow through the orifices may decrease. For example, the vapor recovery line may become blocked, and as a result fuel vapors may not circulate through the vapor recovery line, causing the canister loading rate (and total load) to increase. Excess loading of the canister may cause hydrocarbon escape to the atmosphere. Further, during refueling, the pressure in the fuel tank may increase as fuel is added to the tank. In some examples, the fuel pressure may increase to a level where the fueling is terminated before the fuel tank is full.

The inventors herein have recognized the above issues, and have developed systems and methods to at least partially address them. In one example approach a method of adjusting fuel vapor flow through a recirculation line is provided. The method may comprise adjusting an amount of fuel vapors flowing through a fuel vapor recirculation line, the line coupled on a first end to a fuel tank and on an opposite second end to a fuel fill inlet, by adjusting a position of a variable orifice valve positioned within the recirculation line, via an electronic controller. Additionally or alternatively, the adjusting the position of the valve may comprise opening the valve in response to increases in hydrocarbon emissions from a carbon canister, and closing the valve in response to increases in hydrocarbon emissions from the fuel fill inlet.

As another embodiment, a method may comprise adjusting a ratio of fuel vapors flowing through a fuel vapor recirculation line relative to a fuel vapor storage line by adjusting the position of a continuously variable valve positioned in the fuel vapor recirculation line, where the adjusting may be based on hydrocarbon emission levels from a fuel vapor canister vent line, and hydrocarbon emission levels from a fuel fill inlet of a fuel tank. The ratio may be increased by adjusting the valve to a more open position in response to increases in the hydrocarbon emission levels from the vent line, and wherein the ratio may be decreased by adjusting the valve to a more closed position in response to increases in the hydrocarbon emission levels from the fuel fill inlet.

In this way, loading of a fuel vapor canister may be reduced without increasing hydrocarbon emission levels. By adjusting the variable orifice valve to the most open position in response to increases in hydrocarbon emissions from the canister, more of the fuel vapors exiting the fuel tank may be directed to the recirculation line as opposed to the canister. Thus, the size and cost of the canister may be reduced, and the fuel efficiency of a vehicle system may be increased. Further, premature fuel shut-offs during refueling of the fuel tank may be reduced by adjusting the valve to a more open position to reduce pressure increases in the fuel tank.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
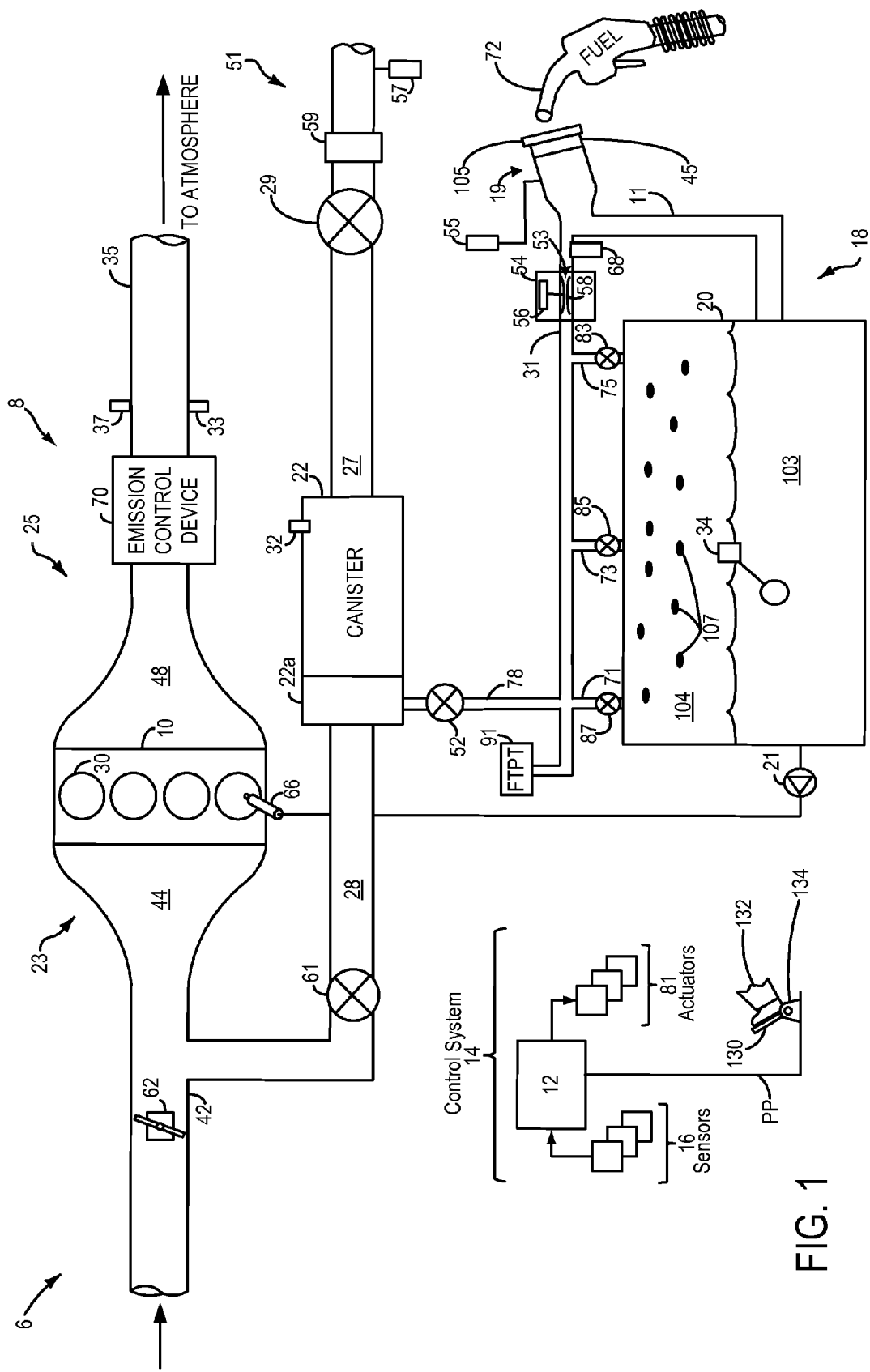
FIG. 1 shows a schematic depiction of a vehicle system including a variable orifice valve in an evaporative emission control device.

The following description relates to systems and methods for regulating fuel vapor flow from a fuel tank to one or more of a fuel vapor canister and a fuel vapor recirculation line in an engine system, such as the engine system of FIG. 1. Fuel vapors may be generated in a fuel tank of the engine system, and to reduce emission of the fuel vapors to the atmosphere, the fuel vapors may be routed to a fuel vapor canister, for storage. As described in the example method of FIG. 2, vapors may be routed from the fuel tank to the canister when pressures in the fuel tank exceed a threshold. The canister may then be purged of the fuel vapors, by flowing fresh, ambient air through the canister to an intake manifold of the engine, where the fuel vapors may then be combusted.

To limit canister loading, a fuel tank recirculation may be provided that my route a portion of fuel vapors from the fuel tank, to a fuel fill inlet of the fuel tank. As described in the example method of FIG. 3, a variable orifice valve position in the recirculation line, may be adjusted to minimize canister loading, while limiting hydrocarbon emissions to the atmosphere. Example adjusting of the valve during varying engine conditions is shown in FIG. 4.

FIG. 1 shows a schematic depiction of a vehicle system 6. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The throttle 62 may be in electrical communication with a controller 12, and as such may be an electronically controlled throttle. Said another way, the controller 12, may send signals to an actuator of the throttle 62, for adjusting the position of the throttle 62. The position of the throttle 62 may be adjusted based on one or more of a desired engine torque, desired air/fuel ratio, barometric pressure, etc. Further, in examples where in the intake includes a compressor such as a turbocharger or supercharger, the position of the throttle 62 may be adjusted based on an amount of boost in the intake passage 42.

The engine exhaust 25 includes an exhaust manifold 48 leading to an exhaust passage 35 that routes exhaust gas to the atmosphere. The atmosphere includes the ambient environment surrounding the vehicle, which may have an ambient temperature and pressure (such as barometric pressure). The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

The vehicle system 6 may be controlled by controller 12 and/or input from a vehicle operator 132 via an input device 130. The input device 130 may comprise an accelerator pedal and/or a brake pedal. A position sensor 134 may be coupled to the input device 130, for measuring a position of the input device 130, and outputting a pedal position (PP) signal to the controller 12. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130. In response to changes in the desired engine torque as determined based on changes in the position of the input device 130, the controller 12 may adjust the position of throttle 62, and/or injectors of engine 10 to achieve the desired engine torque while maintaining a desired air/fuel ratio.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used. Thus, during a refueling event, outputs from the fuel level sensor 34 may be used to estimate a mass flow rate of fuel being added to the tank 20.

Fuel tank 20 may be partially filled with liquid fuel 103, but a portion of the liquid fuel 103 may evaporate over time, producing fuel vapors 107 in an upper dome portion 104 of the tank 20. The amount of fuel vapors 107 produced may depend upon one or more of the ambient temperature, fuel level, and positions of valves 83, 85, and 87. For example, an amount of fuel vapors 107 in the fuel tank 20 may increase with increasing ambient temperatures, as warmer temperatures may result in increased evaporation of fuel 103 in the fuel tank 20.

A fuel tank pressure sensor (FTPT) 91 may be physically coupled to the fuel tank 20 for measuring and/or estimating the pressure in the fuel tank 20. Specifically, FTPT 91 may be in electrical communication with controller 12, where outputs from the FTPT 91 may be used to estimate a pressure in the fuel tank 20. Further, an amount of fuel vapors in the fuel tank 20 may be estimated based on the pressure in the fuel tank 20 and/or the fuel level in the fuel tank 20 as estimated based on outputs from fuel level sensor 34. In still further examples, outputs from the FTPT 91 may be used to estimate a fuel flow rate into the fuel tank 20. Thus, based on changes in the pressure as estimated based on outputs from the FTPT 91, a mass flow rate of fuel flowing into the tank 20 during a refueling event may be estimated. Specifically, during a refueling event, where fuel is added to the tank 20, the fuel pressure in the tank 20 may increase. As such, a mass flow rate of fuel flowing into the tank 20 may be inferred from changes in the fuel pressure in the tank 20, where the mass flow rate may increase with increasing rates of change in the fuel tank pressure. In the example shown in FIG. 1, the FTPT 91 may be positioned between the fuel tank 20 and the canister 22. However in other examples, the FTPT may be coupled directly to the fuel tank 20. In still further examples the FTPT may be coupled directly to the canister 22.

Vapors generated in fuel system 18 may be routed to the evaporative emissions control system (EVAP) 51 which includes fuel vapor canister 22 via vapor storage line 78, before being purged to the engine intake 23. Vapor storage line 78 may be coupled to fuel tank 20 via one or more conduits and may include one or more valves for isolating the fuel tank during certain conditions. For example, vapor storage line 78 may be coupled on a first end to fuel tank 20 via one or more or a combination of conduits 71, 73, and 75. Further, the vapor storage line 78 may be coupled on an opposite second end to the canister 22, specifically buffer 22a, for providing fluidic communication between the fuel tank 20 and the canister 22.

In some examples, the flow of air and vapors between fuel tank 20 and canister 22 may be regulated by a fuel tank isolation valve 52 (FTIV). Thus, FTIV 52 may control venting of fuel tank 20 to the canister 22. FTIV 52 may be a normally closed valve, that when opened, allows for the venting of fuel vapors from fuel tank 20 to canister 22. During a refueling event, the FTIV may adjusted to a more open position to mitigate buildup of excess fuel vapor pressure in the fuel tank 20. Fuel vapors stored in the canister 22, may then be vented to atmosphere, or purged to engine intake system 23 via canister purge valve 61. Specifically, during a purging operation, a canister vent valve (CVV) 29 and the CPV 61 may be opened to allow fresh, ambient air to flow through the canister 22. Fuel vapors in the canister may be desorbed as fresh air flows through the canister, and the desorbed fuel vapors may be purged to the intake manifold 44 due to the vacuum generated in the intake manifold 44 during engine operation. Flow of air and vapors between canister 22 and the atmosphere may be regulated by the canister vent valve (CVV) 29, which may be positioned within vent line 27.

Emissions control system 51 may include fuel vapor canister 22. Canister 22 may be filled with an appropriate adsorbent, and may be configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 51 may further include canister ventilation path or vent line 27 which may provide fluidic communication between canister 22 and the atmosphere. Vent line 27 may be coupled on a first end to the canister 22, and may be open to the atmosphere on an opposite second end. CVV 29 may be positioned within the vent line 27, and may be adjusted to a closed position to fluidically seal the canister 22 from the atmosphere. However, during certain engine operating conditions, such as during purging operations, the CVV 29 may be opened to allow fresh, ambient air through the vent line 27 and into the canister, to increase fuel vapor desorption in the canister 22. In other examples, the CVV 29 may be opened during fuel vapor storing operations (for example, during fuel tank refueling and while the engine is not running) so that air, stripped of fuel vapor after having passed through the canister 22, can be pushed out to the atmosphere.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Fuel vapor levels in the canister 22 may also be referred to as an amount of canister loading. Thus, canister loading increases with increasing level of fuel vapors stored in the canister 22. Canister loading may be estimated based on outputs from one or more sensors. In the example of FIG. 1, a temperature sensor 32 may be coupled to the canister 22 for measuring an amount fuel vapor levels in the canister 22. Specifically, outputs from the sensor 32 corresponding to a temperature in the canister 22 may be used to infer an amount of fuel vapors stored in the canister 22. Increases in fuel vapors levels in the canister 22 may cause increases in the temperature of the canister 22, and as such a relationship may be established between canister temperatures and canister loading. However, in other examples, the fuel vapor levels may be estimated based on outputs from a pressure sensor, where fuel vapor levels may increase with increasing pressure levels. In still further examples, the fuel vapor levels may be estimated based on outputs from an oxygen sensor positioned between the canister 22 and the purge valve 61. In some examples, vent line 27 may include an air filter 59 disposed therein, upstream of canister 22.

A first hydrocarbon sensor may be positioned in the vent line 27 for measuring an amount of hydrocarbons exiting the vent line 27 to the atmosphere. Hydrocarbons and/or other pollutants, such a carbon monoxide, that escape to the atmosphere from the fuel system 18 and/or emissions control system 51, may be referred to herein as bleed-through emissions. The sensor 57 may be coupled to the vent line 27 more proximate the atmosphere than the CVV 29 and the filter 59. Thus, the sensor 57 may be positioned between the CVV 29 and the atmosphere. The hydrocarbon sensor 57 may be any suitable sensor for measuring hydrocarbon levels such as catalytic, photo-ionization, infra-red, gas chromatography, and flame ionization. Sensor 57 may be in electrical communication with controller 12, and outputs from the sensor 57 may be used by the controller 12 to estimate an amount of hydrocarbons escaping to the atmosphere from the canister 22 via the vent line 27. In response to outputs from the sensor 57, the controller 12 may send signals to the actuator 56 for adjusting the position of the flow restriction 58. Specifically, as described in greater detail below with reference to FIG. 3, the controller 12 may adjust the valve 54 to a more open position, to increase the amount of fuel vapors 107 flowing through the recirculation tube 31 in response to increases in the hydrocarbon levels escaping to the atmosphere through the vent line 27.

Fuel system 18 and/or EVAP system 51 may be operated by controller 12 in a plurality of modes by selective adjustment of the various valves and solenoids. One or more of valves 29, 52, and 61 may be normally closed valves. For example, the fuel system may be operated in a fuel vapor storage mode (e.g., during a fuel tank refueling operation and with the engine not running), wherein the controller 12 may open isolation valve 52 while closing canister purge valve (CPV) 61 and/or CVV 29 to direct refueling vapors into canister 22 while preventing fuel vapors from being directed into the intake manifold and/or to the atmosphere.

As another example, the fuel system 18 and/or EVAP system 51 may be operated in a refueling mode (e.g., when fuel tank refueling is requested by a vehicle operator), wherein the controller 12 may open isolation valve 52, while maintaining canister purge valve 61 closed, to depressurize the fuel tank before allowing fuel to be added therein. As such, isolation valve 52 may be kept open during the refueling operation to allow refueling vapors to be stored in the canister. After refueling is completed, the isolation valve may be closed.

As yet another example, the fuel system 18 and/or EVAP system 51 may be operated in a canister purging mode (e.g., after an emission control device light-off temperature has been attained and with the engine running), wherein the controller 12 may open canister purge valve 61 and CVV 29 while closing isolation valve 52. Herein, the vacuum generated by the intake manifold of the operating engine may be used to draw fresh air through vent line 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Based on one or more of the estimated fuel vapor levels in the canister 22, vacuum level in the intake manifold, and a desired purge flow rate, the controller 12, may adjust the position of valves 61 and 29 and 52. Thus, in some examples valves 61, 29 and 52 may be actively controlled valves, and may each be coupled to an actuator (e.g., electromechanical, pneumatic, hydraulic, etc.), where each actuator may receive signals from the controller 12 to adjust the position of its respective valve. However, in other examples, the valves may not be actively controlled, and instead may be passively controlled valves, where the position of the valves may change in response to changes in pressure, temperature, etc., such a wax thermostatic valve.

In examples where the valves 61, 29, and 52 are actively controlled, the valves 61, 29, and 52 may be binary valves, and the position of the valves may be adjusted between a fully closed first position and a fully open second position. However in other examples, the valves 61, 29, and 52 may be continuously variable valves, and may be adjusted to any position between the fully closed first position and fully open second position. Further, the actuators may be in electrical communication with the controller 12, so that electrical signals may be sent between the controller 12 and the actuators. Specifically, the controller may send signals to the actuators to adjust a position of the valves 61, 29, and 52 based on one or more of fuel vapor levels in the canister 22, pressure in the fuel tank 20, fuel level in the fuel tank 20, vacuum level in the intake manifold 44, etc. In some examples, the controller 12 may send signals to the actuators to open one or more of valves 61 and 29, and therefore purge the canister 22, in response to fuel vapor levels in the canister 22 exceeding a threshold. In examples where valves 61, 29 and 52 are solenoid valves, operation of the valves may be regulated by adjusting a driving signal (or pulse width) of the dedicated solenoid.

The fuel tank 20 may include one or more vent valves, which may be deposed in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a first grade vent valve (GVV) 87, conduit 73 may include a fill limit venting valve (FLVV) 85, and conduit 75 may include a second grade vent valve (GVV) 83.

The fuel system 18 may further include a fuel vapor recirculation tube or line 31, which may be coupled on a first end to the fuel tank 20, and on an opposite second end to a fuel fill inlet (also referred to herein as fuel fill system) 19. Specifically, the fuel vapor recirculation line 31, may be coupled on the first end to the fuel tank 20, via one of the fuel tank valves most proximate the fuel fill inlet 19, which in the example shown in FIG. 1, may be the second grade vent valve 83. Thus, in some examples, the recirculation tube 31 may be coupled on the first end to the conduit 75, and on the opposite second end to the fill inlet 19. Specifically, the recirculation line 31 may be coupled on the second end to a filler neck 11 of the fuel tank 20.

The fuel vapor recirculation line 31 and/or the fuel vapor storage line 78 may be configured to hold a percentage of total fuel vapor generated during a refueling event. For example, the vapor recirculation line 31 and/or fuel vapor storage line 78 may in some examples be configured to hold approximately 20% of the total fuel vapor generated during a refueling event. However, in other examples, the recirculation line 31 and/or storage line 78 may be configured to hold more or less than 20% of the total fuel vapors generated in the fuel tank 20. By effectively increasing the vapor dome volume of the fuel tank 20, the recirculation line 31 may limit the rate of flow of fuel vapors 107 to the fuel vapor canister 22. Depending on the configuration of the fuel dispenser, a portion of the fuel vapor held within the recirculation line 31 may be returned to the fuel dispenser.

Recirculation line 31 may include a variable orifice valve 54. Variable orifice valve 54 may also be referred to herein as continuously variable recirculation valve 54. The variable orifice valve 54 may include a flow restriction 58, which may be a diaphragm, ball, plunger, etc., which restricts flow through the valve 54. Thus, an orifice 53 may be formed by the flow restriction 58, where the size of the orifice 53 may be adjusted by adjusting the flow restriction 58. Specifically, adjusting the flow restriction 58 to a more open position may increase the size of the orifice 53, and thereby may increase an amount of gasses flowing through the valve 54. Conversely, adjusting the flow restriction 58 to a more closed position may decrease the size of the orifice 53, thereby decreasing an amount of gasses flowing through the valve 54. In the description herein, closing the valve 54 comprises adjusting the flow restriction 58 to a more closed position. Similarly, opening the valve 54 comprises adjusting the flow restriction 58 to a more open position. In some examples, the valve 54 may include only one orifice. However, in other examples, the valve 54 may include more than one orifice, where the size of each orifice may be adjustable.

A position of the flow restriction 58 may be adjusted by an actuator 56 of valve 54. The actuator may be an electromechanical actuator. However in other embodiments, the actuator may be hydraulic or pneumatic. In some examples the actuator 56 may be included within the valve 54. However, in other examples, the actuator 56 may be external to the valve 54, but may be physically coupled to the valve 54. The actuator 56 is mechanically coupled to the flow restriction 58, for adjusting the position of the flow restriction 58, and therefore the size of the orifice 53. Thus, the electromechanical actuator 56 may be an electric motor comprising a solenoid and armature assembly for generating rotational motion from electrical input. Further, the actuator 56 may be in electrical communication with the controller 12. Based on signals received from the controller 12, the actuator 56 may adjust the position of the flow restriction 58 to adjust the size of the orifice 53. Said another way, the controller 12 may send signals to the actuator 56 to adjust the size of the orifice 53 by adjusting the position of the flow restriction 58. More specifically, a pulse width modulated (PWM) signal may be communicated to the actuator 56 by the controller 12. In one example, the PWM signal may be at a frequency of 10 Hz. In another example, the actuator 56 may receive a PWM signal of 20 Hz. In yet another examples, the solenoid of the actuator 56 may be actuated synchronously.

By adjusting the size of the orifice 53, an amount of air and/or fuel vapors flowing through recirculation line 31 may be adjusted. An example method for adjusting flow through the recirculation line 31 is shown below with reference to FIG. 3. Vapor recirculation line 31 may further include a pressure sensor 68 configured to measure a pressure in the recirculation line 31. Outputs from the sensor 68 may be used by the controller 12 to estimate a pressure in the recirculation line 31. Based on the outputs from the sensor 68, the controller 12 may send signals to the actuator 56 to adjust the position of the flow restriction 58.

Thus, fuel vapors 107 from fuel tank 20 may be directed through the recirculation line 31 and valve 54, on route to the fuel fill inlet 19. Fuel fill inlet 19 may be configured to receive fuel from a fuel source such as dispensing nozzle 72. During a refueling event, the nozzle 72 may be inserted into the fill inlet 19, and fuel may be dispensed into the fuel tank 20. Thus a refueling event comprises the dispensing of fuel from a fuel source into the fuel tank 20. In some examples, fuel fill inlet 19 may include a fuel cap 105 for sealing off the fuel fill inlet 19 from the atmosphere. However, in other examples, the fuel fill inlet 19 may be a capless design and may not include a fuel cap 105. Fuel filler inlet 19 is coupled to fuel tank 20 via fuel filler pipe or neck 11. As such, fuel dispensed from the nozzle 72, may flow through the filler neck 11 into the tank 20.

Fuel fill inlet 19 may further include refueling lock 45. In some embodiments, refueling lock 45 may be a fuel cap locking mechanism. The refueling lock 45 may be configured to automatically lock the fuel cap 105 in a closed position so that the fuel cap 105 cannot be opened. For example, the fuel cap 105 may remain locked via refueling lock 45 while pressure or vacuum in the fuel tank is greater than a threshold. In response to a refuel request, e.g., a vehicle operator initiated request, the fuel tank 20 may be depressurized and the fuel cap 105 unlocked after the pressure or vacuum in the fuel tank 20 falls below a threshold. The refueling lock 45 may be a latch or clutch, which, when engaged, prevents the removal of the fuel cap 105. The latch or clutch may be electrically locked, for example, by a solenoid, or may be mechanically locked, for example, by a pressure diaphragm.

In some embodiments, refueling lock 45 may be a filler pipe valve located at a mouth of fuel filler pipe 11. In such embodiments, refueling lock 45 may not prevent the removal of fuel cap 105. Rather, refueling lock 45 may prevent the insertion of dispensing nozzle 72 into fuel filler pipe 11. The filler pipe valve may be electrically locked, for example by a solenoid, or mechanically locked, for example by a pressure diaphragm.

In some embodiments, refueling lock 45 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 45 is locked using an electrical mechanism, refueling lock 45 may be unlocked by commands from controller 12, for example, when a fuel tank pressure decreases below a pressure threshold. In embodiments where refueling lock 45 is locked using a mechanical mechanism, refueling lock 45 may be unlocked via a pressure gradient, for example, when a fuel tank pressure decreases to atmospheric pressure.

Fuel vapors 107 from recirculation line 31, may flow into filler neck 11, and back into fuel tank 20. Thus a portion of fuel vapors 107 in the fuel tank 20, may flow out of the fuel tank through the GVV 83, into recirculation line 31, through filler neck 11, and back into the fuel tank 20. In some examples, fuel vapors 107, which may include one or more of hydrocarbons, carbon monoxide, and other pollutants, flowing through the recirculation line 31 may escape to the atmosphere through the fuel fill inlet 19. A second hydrocarbon sensor 55 may therefore be coupled to the fill inlet 19, for measuring an amount of hydrocarbons exiting the fuel system 18 via the fuel fill inlet 19. The hydrocarbon sensor may be any suitable sensor for measuring hydrocarbon levels such as catalytic, photo-ionization, infra-red, gas chromatography, and flame ionization. Sensor 55 may be in electrical communication with controller 12, and outputs from the sensor 55 may be used by the controller 12 to estimate an amount of hydrocarbons escaping to the atmosphere via the fuel fill inlet 19. In response to outputs from the sensor 55, the controller 12 may send signals to the actuator 56 for adjusting a position of the flow restriction 58. Specifically, as described in greater detail below with reference to FIG. 3, the controller 12 may adjust the valve 54 to a more closed position, to decrease the amount of fuel vapors 107 flowing through the recirculation tube 31 in response to increases in the hydrocarbon levels escaping to the atmosphere through the fuel fill inlet 19.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include hydrocarbon sensors 55 and 57, temperature sensor 32, universal exhaust gas oxygen (UEGO) sensor 37 located upstream of the emission control device 70, temperature sensor 33, and pressure sensor 68. Other sensors such as pressure, temperature, air/fuel ratio, and composition sensors may be coupled to various locations in the vehicle system 6. As another example, the actuators may include fuel injector 66, throttle 62, FTIV 52, CVV 29, CPV 61, actuator 56 of valve 54, etc. The control system 14 may include controller 12. The controller 12 may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller 12 may receive input data from the various sensors, process the input data, and trigger the actuators in response to the processed input data based on instruction or code programmed therein corresponding to one or more routines. Example control routines are described herein and with regard to FIGS. 2-3.

Canister purging may be intermittently performed by controller 12 in combination with various actuators in EVAP system 51. The controller 12, may regulate the flow of fuel vapors from the fuel tank 20 to the canister 22, and from the canister 22 to the intake manifold 44. Specifically, during a refueling event, the controller 12 may send signals to actuators of valves 52, and 54, for adjusting the position of the valves. By adjusting the position of the valves 52 and 54, the controller 12, may adjust a ratio of fuel vapors flowing through the recirculation line 31 relative to the canister 22 via storage line 78. In this way, an amount of fuel vapors flowing to the canister 22 from the fuel tank 20 may be regulated by the controller 12. Controller 12 may adjust the position of the valve 54 based on signals received from the sensors 55 and 57. Adjusting the position of the valve 54 may influence an amount of fuel vapors flowing to the canister 22. An amount of fuel vapors flowing to the canister 22 may increase in response to closing of the valve 54, and may decrease in response to opening of the valve 54. Put more simply, a first portion of fuel vapors exiting the tank 20 may flow through the recirculation line 31, while a second portion of the fuel vapors exiting the tank 20 may flow to the canister 22. By adjusting the position of valve 54, the controller may adjust the relative amount of fuel vapors flowing through recirculation line 31 versus storage line 78. In this way, the controller 12 may regulate the rate at which the canister 22 is loaded with fuel vapors.

In some examples, if the fuel vapor flow rate to the canister 22 exceeds a threshold, and/or fuel vapor levels in the canister 22 exceed a threshold, hydrocarbons may leak through the canister 22 and escape to the atmosphere via vent line 27. Thus, by adjusting the valve 54 to a more open position, thereby allowing a greater portion of the fuel vapors exiting the tank 20 to flow through the recirculation line 31, bleed-through emissions from the canister 22 may be reduced. In other examples, if the fuel vapor flow rate through the recirculation line 31 exceeds a threshold, hydrocarbons may leak through the fuel fill inlet 19 and escape to the atmosphere. By adjusting the valve 54 to a more closed position, thereby allowing a greater portion of the fuel vapors exiting the tank 20 to flow through the storage line 78, bleed-through emissions from the fuel fill inlet 19 may be reduced. The controller 12, may continually adjust the position of the valve 54, to regulate the amount of fuel vapors flowing through storage line 78 and recirculation line 31, so that an amount of fuel vapors flowing through the recirculation line 31 may be increased. Thus, by including a variable adjustable orifice in the recirculation line 31, an amount of fuel vapors flowing through the recirculation line 31 may be increased relative to recirculation lines including orifices of fixed sizes, without increasing an amount of hydrocarbon emissions to the atmosphere. As a result, an amount of fuel vapors flowing to the canister 22 may be reduced, and therefore the size of the canister 22 may be reduced.

The controller 12 may further determine if canister purging is desired based on one or more of fuel vapor levels in the canister 22, a desired air/fuel ratio, desired engine torque, position of throttle 62, intake MAF, vacuum in intake manifold 44, etc. The intake manifold 44 may only be capable of receiving up to a threshold amount of hydrocarbons from the canister 22 depending on the desired torque, air/fuel ratio, etc. In other words, the controller 12, may determine that purging of canister 22 is desired based both an amount of fuel vapors in the canister 22, and on an estimated amount of hydrocarbons that may enter the intake manifold 44 upon opening of purge valve 61.

Thus, the controller may estimate canister purge levels based on signals received from sensor 32. Further, the controller 12 may determine whether purging of canister 22 is desired based on one or more an intake manifold vacuum level which may be estimated based on outputs of sensor 64, an intake MAF which may be estimated based on outputs of sensor 68, and the estimated fuel vapor level in the canister 22. To initiate purging of the canister 22, controller 12 may send signals to one or more of valves 61 and 29, for adjusting the valves 61 and 29 to more open positions.

Figure 2:
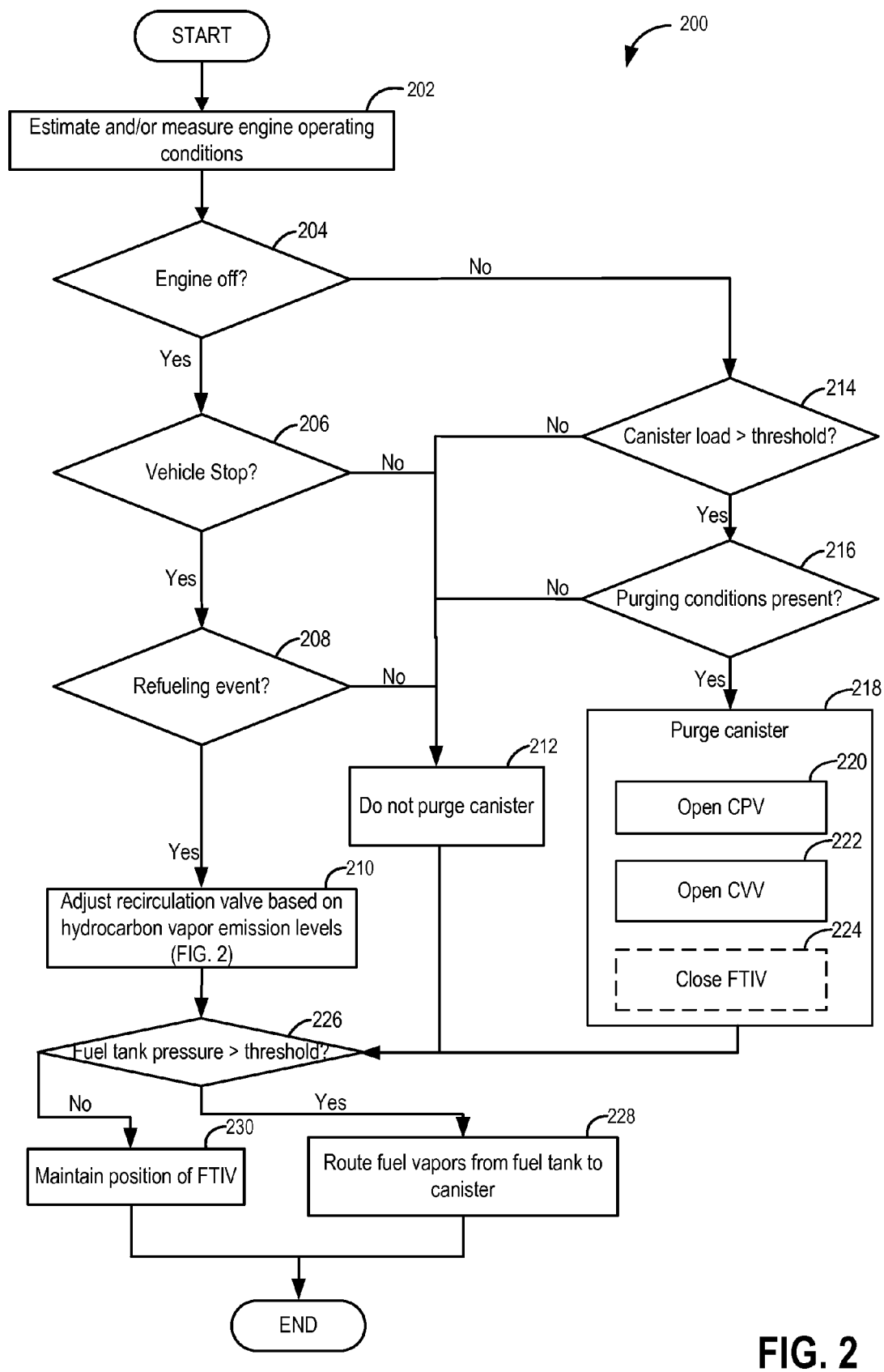
FIG. 2 shows a flow chart of an example method for regulating fuel vapor flow through an evaporative emission control device.

Turning now to FIG. 2, it shows a flow chart of an example method 200 for regulating fuel vapor flow through an evaporative emission control device (e.g., EVAP system 51 shown in FIG. 1). The EVAP device may comprise a canister (e.g., canister 22 shown in FIG. 1) for storing fuel vapors released from a fuel tank (e.g., fuel tank 20 shown in FIG. 1). Under certain engine operating conditions, such as during refueling of the fuel tank, fuel vapors stored in the fuel tank may be routed to the canister so that they are not emitted to the atmosphere as pollutants. When an engine (e.g., engine system 8 shown in FIG. 1) is running, vacuum may be generated in an intake manifold (e.g., intake manifold 44 shown in FIG. 1) of the engine, and said vacuum may be used to draw in fresh air through a vent line (e.g., vent line 27 shown in FIG. 1) to purge fuel vapors from the canister to the engine for combustion.

Instructions for carrying out method 200 and the rest of the methods included herein may be executed by a controller (e.g., controller 12 shown in FIG. 1) based on instructions stored on a memory of the controller and in conjunction with signals received from sensor of the engine system, such as the sensors described above with reference to FIG. 1. The controller may employ engine actuators of the engine system to adjust engine operation, according to the methods described below. In particular, the controller may adjust the position of various valves of the EVAP device and/or fuel system (e.g., fuel system 18 shown in FIG. 1) in response to signals received from one or more of a sensor of the canister (e.g., sensor 32 shown in FIG. 1) configured to estimate an amount of fuel vapors stored in the canister, a first hydrocarbon sensor (e.g., sensor 57 shown in FIG. 1) configured to detect hydrocarbon emission levels to the atmosphere from the vent line, and a second hydrocarbon sensor (e.g., sensor 55 shown in FIG. 1) configured to detect hydrocarbon emission levels to the atmosphere from a fuel fill inlet (e.g., fuel fill inlet 19 shown in FIG. 1) of the fuel tank. In response to the signals received from the various sensor, the controller may send signals to actuators of one or more of a CPV (e.g., CPV 61 shown in FIG. 1), a FTIV (e.g., FTIV 52 shown in FIG. 1), a CVV (e.g., CVV 29 shown in FIG. 1), and a continuously variable vapor recirculation valve (e.g., variable orifice valve 54 shown in FIG. 1).

Method 200 begins at 202 which comprises estimating and/or measuring engine operating conditions. Engine operating conditions may include a fuel tank pressure as estimated based on outputs from a fuel tank pressure sensor (e.g., FTPT sensor 91 shown in FIG. 1), fuel level as estimated based on outputs from a fuel level sensor (e.g., fuel level sensor 34 shown in FIG. 1), a canister load as estimated based on outputs from the canister sensor, a driver demanded torque as estimated based on input from a vehicle operator (e.g., vehicle operator 130 shown in FIG. 1) via an input device (e.g., input device 132 shown in FIG. 1), etc.

After estimating engine operating conditions at 202, method 200 may then proceed to 204, which comprises determining whether or not the engine is off. Determining if the engine is off may be based on a position of a throttle valve (e.g., throttle 62 shown in FIG. 1), fuel injection amount, manifold air pressure, a vehicle key-off event, the driver demanded torque, etc. Thus, if it is determined that fuel is not being injected to the engine, and that the engine is off, then method 200 may continue to 206 which comprises determining if a vehicle stop conditions exists.

A vehicle stop condition may exists if a vehicle system (e.g., vehicle system 6 shown in FIG. 1) and in some cases, the engine, are not moving. Determining if the vehicle system is stopped may be based on outputs from one or more sensors (e.g., a crankshaft sensor, wheel position sensor, etc.) used in determining the speed of the vehicle system. The vehicle may be stopped after a key-off event. However, in other examples the vehicle system may be stopped during idling.

If the vehicle is not moving, and it is determined at 206 that a vehicle stop condition exists, then method 200 may continue to 208 which comprises determining if a fueling event is occurring and/or is desired. A fueling event may comprise conditions where fuel is being added to the fuel tank. Thus a fueling event may comprise inserting and/or receiving a nozzle (e.g., nozzle 72 shown in FIG. 1-2) into the fuel tank, and subsequently dispensing fuel into the fuel tank via a fuel fill inlet (e.g., fuel fill inlet 19 shown in FIG. 1) and filler neck (e.g., filler neck 11 shown in FIG. 11) of the fuel tank. In this way, fuel is added to the fuel tank during a fueling event. In the description herein, a fueling event may also be referred to as a refueling event.

Thus, it may determined whether or not a fueling event is occurring based on whether or not the nozzle is inserted in the fuel fill inlet, and whether fuel is being added to the fuel tank. If the nozzle is inserted in the filler tube and/or fuel is being added to the fuel tank, then it may be determined at 208 that a fueling event is occurring. Determining whether or not the nozzle is inserted in the fuel fill inlet may be based on a position sensor disposed within the filler neck. In other examples, it may be determined whether or not the nozzle is inserted based on a position of a fuel tank cap (e.g., cap 105 shown in FIG. 1). It may determined whether or not fuel is being added to the fuel tank based on fuel level in tank, where the fuel level may be estimated based on outputs from the fuel level sensor. In other examples, the rate at which fuel is being added to the fuel tank may be estimated based on outputs from the fuel level sensor. In still further examples, the fuel level and/or mass flow rate of fuel into the fuel tank may be additionally or alternatively estimated based on the pressure in the fuel tank as determined based on outputs from the FTPT sensor.

Specifically, the fuel tank pressure may increase with increases in the fuel level in the fuel tank. Thus, an amount of fuel in the fuel tank, and/or a mass flow rate of fuel into the fuel tank during refueling may be inferred from the pressure in the fuel tank. In this way, outputs from the FTPT sensor may be used to determine a fuel flow rate into the tank during refueling. If the fuel level in the tank is increasing, then it may be determined that a fueling event is occurring.

If it is determined at 208 that a refueling event is occurring, then method 200 may proceed to 210 which comprises adjusting the recirculation valve based on hydrocarbon vapor emission levels in the EVAP system and/or the fuel system, as is explained in greater detail below with reference to FIG. 3. Thus, in some examples, method 300 shown in FIG. 3, may be run as a subroutine of method 200 at 210. In other words, method 200 may execute method 300 at 210. Hydrocarbons emission levels from the EVAP system may be estimated based on outputs from the first hydrocarbon sensor, and hydrocarbon emission levels from the fuel system may be estimated based on outputs from the second hydrocarbon sensor.

Adjusting of the recirculation valve may comprise adjusting of the size of an orifice (e.g., orifice 53 shown in FIG. 1) formed by a flow restriction (e.g., flow restriction 58 shown in FIG. 1) of the valve. The valve may be position in the recirculation line for regulating the flow of gasses and fuel vapors through the recirculation line. Adjusting of the flow restriction and orifice size may be performed in a similar manner to that previously described above in FIG. 1 for the valve 54. Thus, the method may include sending signals from the controller to an actuator (e.g., actuator 56 shown in FIG. 1) for adjusting the position of the flow restriction. In response to the signals received from the controller, the actuator may adjust the flow restriction to either increase or decrease the size of the orifice. Specifically, the recirculation valve may be adjusted to a more open position in response to increases in the hydrocarbon emission level from the EVAP system, and to a more closed position in response to increases in the hydrocarbon emission level from the fuel system. After adjusting the position of the recirculation valve at 210, method 200 then returns.

However, if at 208 if it determined that a refueling event is not occurring, then method 200 may proceed to 212 which comprises not purging the canister. Thus, the method 200 at 212 may comprise maintaining the CPV in a closed position so that approximately no fuel vapors flow from the canister to the intake manifold. Further, the method 200 at 212 may comprise maintaining the CVV in a closed position so that the canister is fluidically sealed from the atmosphere, and so that approximately no gasses flow between the canister and the atmosphere via the vent line. Said another way, closing of the CPV and CVV may comprise adjusting the position of the valves to fully closed positions where gasses and/or fluids do not flow through the valves. Further, the method at 212 may additionally comprise maintaining the position of the recirculation valve in a calibrated first position. The calibrated first position of the recirculation valve may be a position of the valve that may be pre-set based on manufacture testing, and may be stored in memory of the controller. Thus, the position of the recirculation valve may be maintained if a refueling event is not occurring.

Returning to 206, if it is determined that the vehicle is not stopped, then the method 200 may proceed to 212 and may not purge the canister and may maintain the position of the recirculation valve.

If at 204, it is determined that the engine is running, method 200 may continue to 214 which comprises determining if the canister load is greater than a threshold. The canister load may be estimated based on outputs from the canister sensor. Specifically, in examples where the sensor is a temperature sensor, the fuel vapor level in the canister may be inferred from the temperature of the canister as estimated based on outputs from the temperature sensor. The canister temperature may increase with increases in the fuel vapor level and as such a relationship between the canister temperature and canister loading may be established. However, in other examples where the sensor is a pressure sensor, the fuel vapor level in the canister may be inferred from the pressure of the canister as estimated based on outputs from the pressure sensor. The canister pressure may increase with increases in the fuel vapor level and as such a relationship between the canister pressure and canister loading may be established.

If the canister load (e.g., amount of fuel vapors in the canister) is greater than the threshold, then it may be desired to purge the canister of fuel vapors. However, if the canister load is less than a threshold, then method 200 may proceed to 212 and not purge the canister. Thus, the canister may only be purged if the fuel vapor levels in the canister exceed a threshold.

If the canister load is determined to be greater than the threshold at 214, method 200 may proceed to 216 which comprises determining if purging conditions are present. Canister purging conditions may be present if a vacuum level in the intake manifold is greater than threshold. Additionally, or alternatively, canister purging conditions may be present, if opening of the CPV would not cause a decrease in other flows to the intake manifold such as from a brake booster. In still further examples, canister purging conditions may be present if opening of the CPV would not result in excess hydrocarbons in the intake manifold. Thus, determining if purging conditions are present may comprise determining the vacuum level in the intake manifold, desired air/fuel ratio, driver demanded torque, an estimated amount of hydrocarbons that may flow to the intake manifold upon opening of the CPV, etc. Thus, it may be determined that purging conditions are not present if opening of the CPV would reduce engine performance, and/or result in a deviation from the driver demanded torque, etc.

If it is determined that purging conditions are not present, then method 200 may proceed to 212 and not purge the canister. However, if canister purging conditions are present at 216, then method 200 may continue to 218 which comprises purging the canister. As such, the method 200 at 218 may include one or more of opening the CPV at 220, opening the CVV at 222, and closing the FTIV at 224.

Closing of the FTIV may comprise adjusting the position of the FTIV towards a more closed position, where an opening formed by the FTIV may decrease, and thereby an amount of fuel vapors flowing through the FTIV to the canister from the fuel tank may decrease. In some examples, the FTIV may be adjusted to a fully closed position so that gasses do not flow through the FTIV. Thus, in some examples, purging of the fuel vapor recovery system may comprise flowing fuel vapor gasses from the canister to the intake manifold by opening the CPV and CVV.

Method 200 may then proceed from either 210 after adjusting the recirculation valve, 212 after not purging the canister, or 218 after purging the canister to 226, which comprises determining if the fuel tank pressure is greater than a threshold. In alternate embodiments, method 200 may proceed to 226 before proceeding to 210, 212, or 218. In still further embodiments, the method 200 may comprise continually monitoring the fuel tank pressure. To avoid emission of hydrocarbons to the atmosphere from the fuel tank, fuel vapors may be routed to the canister when fuel tank pressures reach the threshold pressure. Thus the threshold at 226 may represent a fuel tank pressure, above which may result in excess hydrocarbons being emitted to the atmosphere. As such, if the fuel tank pressure is greater than the threshold at 226, the method 200 may proceed to route fuel vapors from the fuel tank to the canister at 228.

Routing of the fuel vapors from the fuel tank to the canister may comprise opening of the FTIV. In some examples, the method 200 at 228 may additionally comprise opening the CVV. Opening the CVV may allow air, effectively void of hydrocarbons after having passed through the canister, to escape to the atmosphere. Method 200 then ends.

However, if at 226 it is determined that the fuel tank pressure is not greater than the threshold, then it may determined that fuel vapors do not need to be routed to the canister, and the method may proceed to 230 which comprises maintaining the position of the FTIV. Method 200 then ends.

It should be appreciated that 226 and 228 may be executed in a different order than shown in the example of FIG. 2. Thus, the fuel tank pressure may continually be monitored by the controller based on outputs from the FTPT sensor. If the fuel tank pressure increases above the threshold, the FTIV may be opened to allow fuel vapors to exit the fuel tank and flow towards the canister. Additionally, the method at 228 may include opening one or more of a gas vent valve (e.g., vent valves 87 and 83 shown in FIG. 1) and a fill limit vent valve (FLVV 85 shown in FIG. 1). Thus, in some examples, the FTIV may be opened during a refueling event before adjusting of the recirculation valve, if the fuel tank pressure exceeds the threshold. Further, during non-refueling conditions, such as when the engine is on, the FTIV may be opened to vent fuel vapors from the fuel tank if the fuel tank pressure exceeds the threshold.

Figure 3:
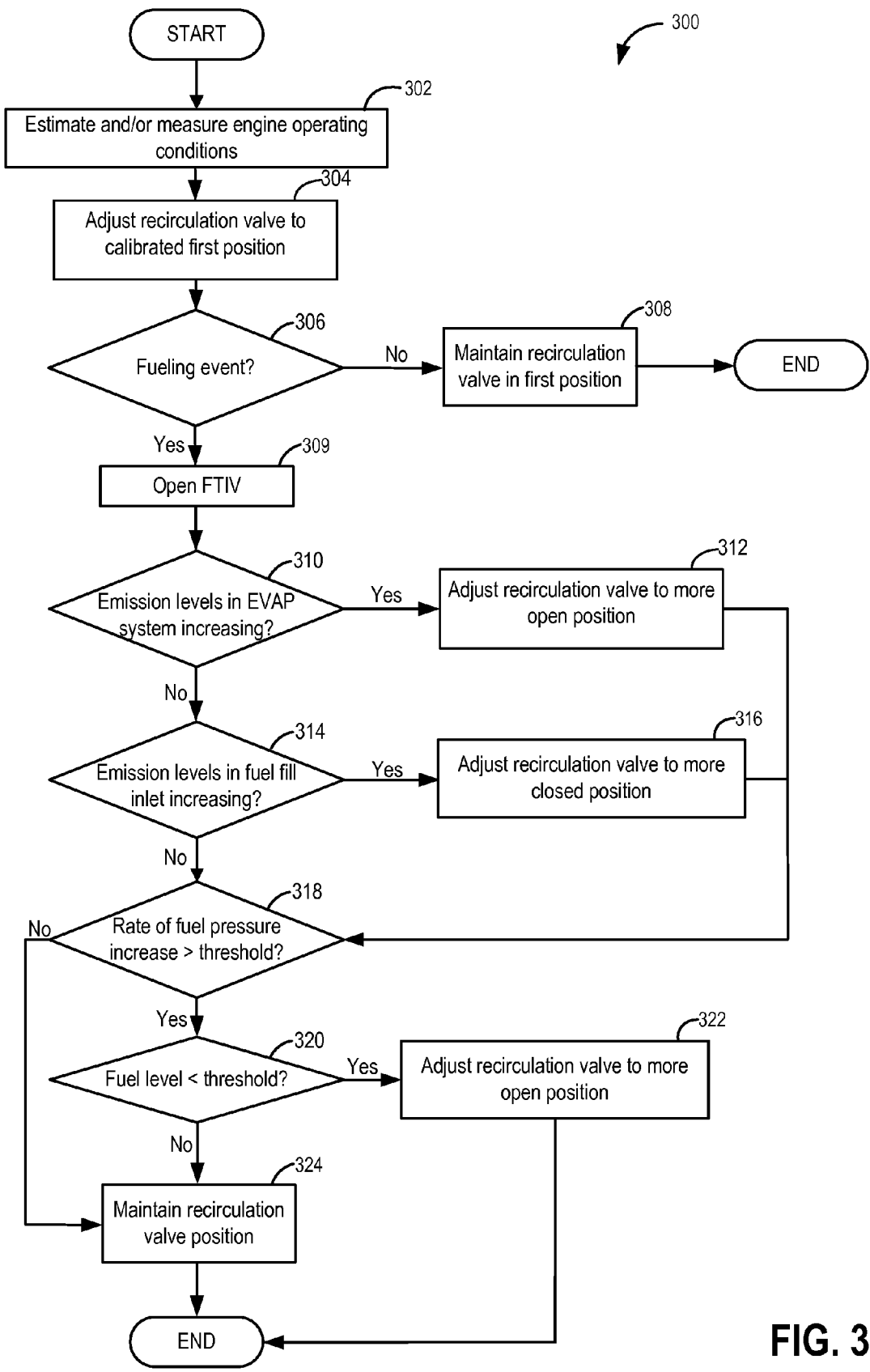
FIG. 3 shows a flow chart of an example method for adjusting a variable orifice valve during refueling of a fuel tank.
Figure 4:
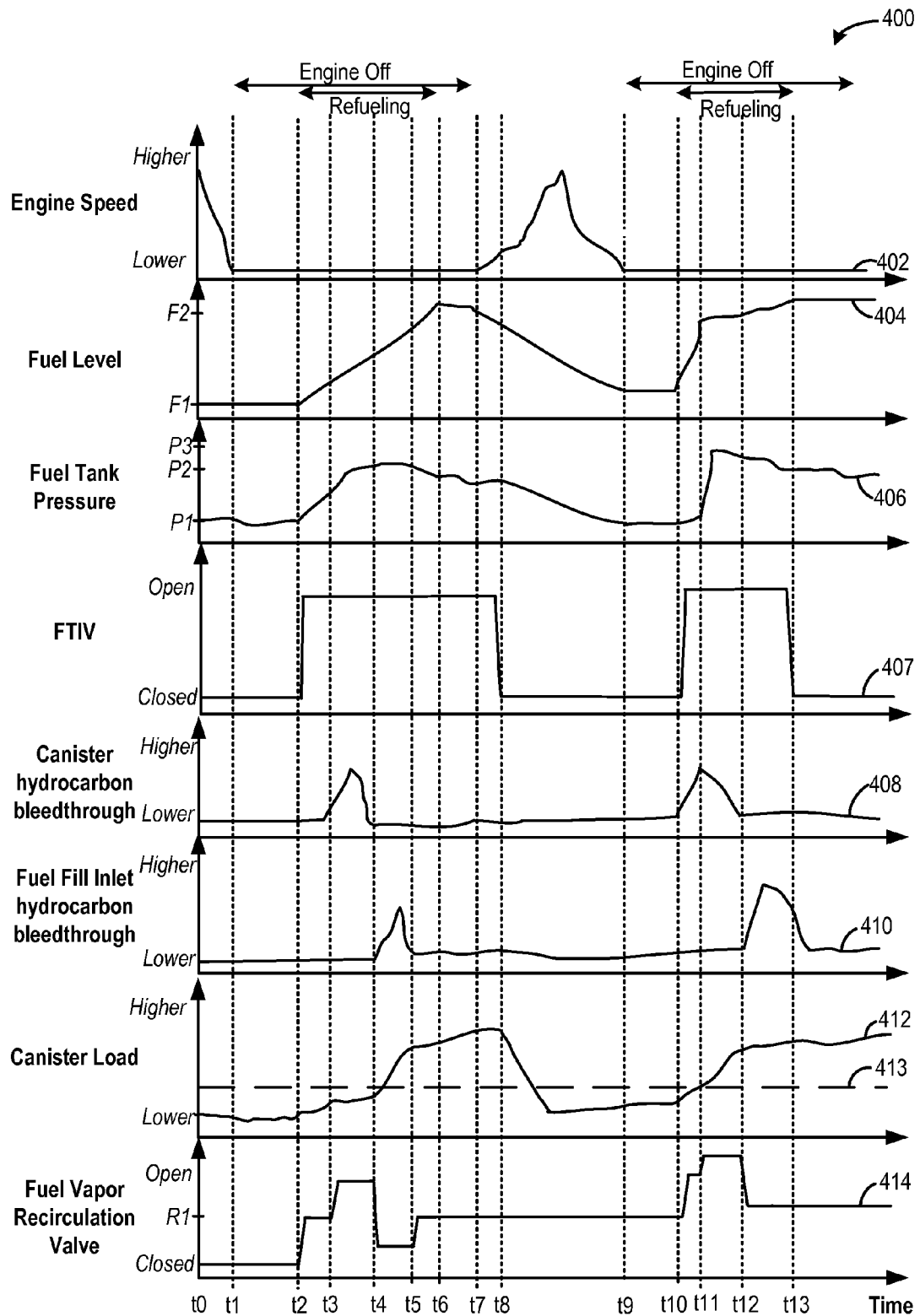
FIG. 4 is a graph depicting adjustments to a variable orifice valve of an evaporative emission control device under varying engine operating conditions.

Turning now to FIG. 3, it shows an example method 300 for adjusting a variable orifice valve (also referred to herein as a continuously variable vapor recirculation valve) positioned in a recirculation line (e.g., recirculation line 31 shown in FIG. 1) of a fuel system (e.g., fuel system 18 shown in FIG. 1). Specifically, method 300 is an example method which may be executed for regulating a relative amount of flow from a fuel tank (e.g., fuel tank 20 shown in FIG. 1) to a recirculation line (e.g., recirculation line 31 shown in FIG. 1) and/or to a canister (e.g., canister 22) of an EVAP system (e.g., EVAP system 51 shown in FIG. 1) via a fuel vapor storage line (e.g., storage line 78 shown in FIG. 1). During engine refueling, the valve (e.g., valve 54 shown in FIG. 1) may be adjusted based on an amount of hydrocarbons emitted from the fuel system via a fuel fill inlet (e.g., fuel fill inlet 19 shown in FIG. 1), and/or an amount of hydrocarbons emitted from the EVAP system via the canister and vent line (e.g., vent line 27 shown in FIG. 1). As such, method 300 may be executed as a subroutine of method 200 described above with reference to FIG. 2 at 210. Thus, when an engine (e.g., engine system 8 shown in FIG. 1) is off, a vehicle system (e.g., vehicle system 6 shown in FIG. 1) is stopped, and a refueling event is occurring, a method such as method 300 may be executed to adjust the position of the recirculation valve.

Method 300 begins at 302 which comprises estimating and/or measuring engine operating conditions. Engine operating conditions may include a fuel tank pressure as estimated based on outputs from a fuel tank pressure sensor (e.g., FTPT sensor 91 shown in FIG. 1), fuel level as estimated based on outputs from a fuel level sensor (e.g., fuel level sensor 34 shown in FIG. 1), a canister load as estimated based on outputs from the canister sensor, a driver demanded torque as estimated based on input from a vehicle operator (e.g., vehicle operator 130 shown in FIG. 1) via an input device (e.g., input device 132 shown in FIG. 1), etc.

After estimating engine operating conditions at 302, method 300 may continue to 304 and adjust the recirculation valve to a calibrated first position. As described above with reference to 212 of method 200 in FIG. 2, the calibrated first position may be a position of the valve stored in the memory of the controller.

Method 300 may then proceed to 306 which may comprise determining if a fueling event is occurring. As such, 306 may be executed in a similar manner as described above with reference to 208 of FIG. 2. Thus, the fueling event may be determined based on whether a nozzle (e.g., nozzle 72 shown in FIG. 1) is inserted into the fuel fill inlet, and/or whether the fuel level in the fuel tank as estimated from outputs of a fuel level sensor (e.g., fuel level sensor 34 shown in FIG. 1) is increasing. If it is determined that a fueling event is not occurring, method 300 may continue to 308 which comprises maintaining the position of the recirculation valve in the first position. Method 300 then ends.

However, if at 306 it is determined that a refueling event is occurring, method 300 may then continue to 309 which comprises opening the FTIV. Thus, the method at 309 may comprise adjusting the FTIV towards a more open position so that fuel vapors may flow from the fuel tank to the canister. After opening the FTIV, method 300 may continue to 310 which comprises determining if emission levels in the EVAP system are increasing. More specifically, the method 300 at 310 may comprise determining if emission levels from the canister of the EVAP system, through the vent line to the atmosphere are increasing. Determining whether or not emission levels in the vent line are increasing may be determined based on outputs from a first hydrocarbon sensor (e.g., hydrocarbon sensor 57 shown in FIG. 1), positioned within the vent line. Thus, the first hydrocarbon sensor may be positioned between the canister and the atmosphere for detecting leakage of hydrocarbons from the canister. Changes in the outputs from the hydrocarbon sensor may be used to infer changes in the amount of hydrocarbon emissions from the EVAP system. However, in another embodiment, the method at 310 may comprise determining if the amount of hydrocarbons emitted from the vent line exceed a threshold. In still further embodiments, the method at 310 may comprise determining if the rate of increase in hydrocarbon emission levels from the canister through the vent line is greater than a threshold rate. If emissions of hydrocarbons from the canister and EVAP system is increasing, and/or is greater than a threshold, then method 300 may continue to 312 which comprises adjusting the recirculation valve to a more open position.

Adjusting the recirculation valve to a more open position may be performed in a similar manner to that described in operation of valve 54 shown above with reference to FIG. 1. Thus, an actuator (e.g., actuator 56 shown in FIG. 1) may adjust the position of a flow restriction (e.g., flow restriction 58 shown in FIG. 1) based on signals received from the controller. The flow restriction may be adjusted to a more open position to increase the size of an orifice (e.g., orifice 53 shown in FIG. 1) formed by the flow restriction. Opening of the valve may enable a greater amount of fuel vapors to pass through the valve. Thus, opening the recirculation valve, may enable a greater portion of fuel vapors exiting the fuel tank to pass through the recirculation line. In doing so, a smaller portion of the fuel vapors exiting the fuel tank may pass to the canister. By reducing the amount of vapors flowing to the canister by increasing the opening of the recirculation valve, the amount of hydrocarbons emitted to the atmosphere from the canister may be reduced.

The adjusting of the valve to the more open position may comprise adjusting the valve a second position, where the second position is more open than the calibrated first position. However, in other examples, the adjusting of the valve to the more open position may comprise increasing the size of the orifice by a pre-set amount. However, in still further examples the amount that the valve is opened may be based on an amount of increase in the emission levels from the canister and EVAP system. Thus, the valve may be opened to a greater degree for greater increases in the amount of hydrocarbons exiting to the atmosphere via the vent line. Specifically, the amount that the valve is opened may monotonically increase for increasing rates of increase in the emissions from the EVAP system. Said another way, the degree to which the valve is opened may be proportional to the amount of increase in the hydrocarbon emission from the vent line.

After adjusting the recirculation valve to a more open position at 312, method 300 may continue to 318 which comprises determining if a rate of fuel pressure increase in the fuel tank is greater than a threshold.

Returning to 310, if it is determined that the amount of hydrocarbons emitted through the vent line to the atmosphere are not increasing and/or are below a threshold, method 300 may continue to 314 which comprises determining if emission levels in the fuel fill inlet are increasing. As described above with reference to FIG. 1, during refueling, fuel vapors may exit the fuel tank, and pass through the recirculation tube via the recirculation valve. Fuel vapors may flow towards the fuel fill inlet of the fuel tank, and pass into the filler neck of the fuel tank. If the flow rate of fuel vapors through the recirculation line exceeds a threshold, fuel vapors may escape to the atmosphere through the fuel fill inlet. As such, determining whether or not emission levels from the fuel fill inlet are increasing may be determined based on outputs from a second hydrocarbon sensor (e.g., hydrocarbon sensor 55 shown in FIG. 1), positioned within the fuel fill inlet. Thus, the second hydrocarbon sensor may be positioned between the recirculation line and the atmosphere for detecting leakage of hydrocarbons from the fuel tank and fuel system. Changes in the outputs from the second hydrocarbon sensor may be used to infer changes in the amount of hydrocarbon emissions from the fuel system. However, in another embodiment, the method at 310 may comprise determining if the amount of hydrocarbons emitted from the fuel fill inlet exceed a threshold. In still further embodiments, the method at 310 may comprise determining if the rate of increase in hydrocarbon emission levels from the fuel fill inlet through the recirculation line is greater than a threshold rate. If emissions of hydrocarbons from the fuel fill inlet and fuel system is increasing, and/or is greater than a threshold, then method 300 may continue from 314 to 316, which comprises adjusting the recirculation valve to a more closed position.

Adjusting the recirculation valve to a more closed position may be performed in a similar manner to that described in operation of valve 54 shown above with reference to FIG. 1. Thus, the actuator of the recirculation valve may adjust the position of the flow restriction based on signals received from the controller. The flow restriction may be adjusted to a more closed position to decrease the size of the orifice formed by the flow restriction. Closing of the valve may reduce the amount of fuel vapors passing through the valve. Thus, closing the recirculation valve may decrease an amount of fuel vapors passing through the recirculation line. In doing so, a larger portion of the fuel vapors exiting the fuel tank may pass to the canister. By reducing the amount of vapors flowing through the recirculation line by decreasing the opening of the recirculation valve, the amount of hydrocarbons emitted to the atmosphere from the fuel fill inlet may be reduced.

The adjusting of the valve to the more closed position may comprise adjusting the valve a third position, where the third position is more closed than the calibrated first position. However, in other examples, the adjusting of the valve to the more open position may comprise decreasing the size of the orifice by a pre-set amount. However, in still further examples the amount that the valve is closed may be based on an amount of increase in the emission levels from the fuel fill inlet and fuel system. Thus, the valve may be closed to a greater degree for greater increases in the amount of hydrocarbons exiting to the atmosphere via the recirculation line. Specifically, the amount that the valve is closed may monotonically increase for increasing rates of increase in the emissions from the fuel system. Said another way, the degree to which the valve is closed may be proportional to the amount of increase in the hydrocarbon emission from the fuel fill inlet.

After adjusting the recirculation valve to a more closed position at 316, method 300 may continue to 318 which comprises determining if a rate of fuel pressure increase in the fuel tank is greater than a threshold. Returning to 314, if it is determined that the emission level from the fuel fill inlet are not increasing, then method 300 may continue to 318 and determine if the rate of fuel pressure increase in the fuel tank is greater than a threshold. Thus, method 300 may proceed to 318 from either 314 if emission levels from the fuel fill inlet are not increasing, or from 312 or 316.

Determining if the rate of fuel pressure increase is greater than the threshold may comprise estimating fuel pressure levels in the fuel tank via the FTPT sensor. The fuel tank pressure may be continually monitored by the controller based on outputs from the FTPT sensor. If the fuel tank pressure increases by more than the threshold rate, then the method 300 may continue to 320 which comprises determining if the fuel level in the tank is less than a threshold. However, if the rate of fuel pressure increase is not greater than the threshold rate of increase, then method 300 may continue from 318 to 324, which comprises maintaining the position of the recirculation valve. Thus, at 324, the method may comprise not adjusting the valve to a more open or more closed position, but instead maintaining the valve in the current position. Method 300 then returns.

The method 300 may alternatively proceed to 324 and maintain the position of the recirculation valve if the rate of fuel pressure increase is greater than the threshold at 318, but the fuel level is determined to not be less than the threshold at 320. Thus, if at 320 the fuel level is determined to not be less than the threshold, method 300 may continue to 324 and maintain the position of the recirculation valve. Method 300 then returns.

However, if the rate of fuel pressure increase is determined to be greater than the threshold at 318, and the fuel level is determined to be less than the threshold at 320, then method 300 may continue from 320 to 322 which comprises adjusting the recirculation valve to a more open position. In some examples, the threshold fuel level at 320 may be approximately 100% of the fuel tank volume. However, in other examples, the threshold may represent a fuel level in the fuel tank that is less than 100% of the volume of the tank. Adjusting the recirculation valve to the more open position at 322 may comprise adjusting the valve a fourth position, where the fourth position is more open than the calibrated first position. However, in other examples, the adjusting of the valve to the more open position at 322 may comprise increasing the size of the orifice by a pre-set amount. However, in still further examples the amount that the valve is opened may be based on an amount of increase in the fuel tank pressure and/or fuel level in the fuel tank. Thus, the valve may be opened to a greater degree for greater increases in the fuel tank pressure. Specifically, the amount that the valve is opened may monotonically increase for increasing rates of increase in the fuel tank pressure for a given fuel level in the fuel tank. Said another way, the degree to which the valve is opened may be proportional to the amount of increase in the fuel tank pressure at a particular fuel level. Method 300 then returns.

By adjusting the valve to the more open position in response to increases in the fuel tank pressure greater than the threshold while fuel levels are less than a threshold, premature fuel-shut off events may be mitigated. Specifically, by adjusting the valve to the more open position, a greater amount of fuel vapors may exit the fuel tank, resulting in lowered fuel tank pressures. When fuel tank pressures increase by more than the threshold rate, fuel tank refueling may terminate, even if the fuel tank is not full. Thus, by opening the recirculation and enabling a greater amount of fuel vapors to exit the fuel tank, fuel tank pressure spikes may be minimized, and thus, premature fuel shut-offs may be reduced.

It should be appreciated that 310, 314, 318, and 320 may be executed in a different order than described above. Further, it should appreciated that 310, 314, 318, and 320 may be executed approximately simultaneously. Thus, the controller may continuously monitor hydrocarbon emission levels from both the vent line and the fuel fill inlet, as well as the fuel level in the fuel tank and fuel tank pressure. As such, upon initiation of a fueling event, the recirculation valve may be adjusted to the calibrated first position. The recirculation valve may then be adjusted away from the first position based on one or more of changes in the amount of hydrocarbon emissions from the canister and the fuel fill inlet, and changes in the fuel pressure of the fuel tank while the fuel level in the tank is below a threshold. In this way, the recirculation valve may be continually adjusted. If the hydrocarbon emissions from the canister increase, the recirculation valve may be adjusted to a more open position to increase the amount of fuel vapors flowing through the recirculation line relative to the storage line. Conversely, if the hydrocarbon emission from the fuel fill inlet increase, the recirculation valve may be adjusted to a more closed position to decrease the amount of fuel vapors flowing through the recirculation line relative to the storage line.

By adjusting the position of the recirculation line, the amount of fuel vapors flowing to the canister may be adjusted. Said another way, for fuel vapors exiting the fuel tank, the ratio of the exiting fuel vapors that may be directed to the canister relative to the recirculation line may be adjusted by adjusting the recirculation valve. Adjusting the valve to a more open position may increase fuel vapor flow through the recirculation line, decrease fuel vapor flow to the canister, and therefore increase the ratio of fuel vapor flow through the recirculation line relative to the storage line and canister. Conversely, adjusting the valve to a more closed position may decrease fuel vapor flow through the recirculation line, increase fuel vapor flow to the canister, and therefore decrease the ratio of fuel vapor flow through the recirculation line relative to the storage line and canister.

Turning now to FIG. 4, it shows a graph 400 illustrating example fuel vapor flow through EVAP and fuel systems in an engine system, such as the engine system of FIG. 1. Graph 400 includes an indication of engine speed at plot 402, fuel level in a fuel tank (e.g., fuel tank 20 shown in FIG. 1) at plot 404, fuel tank pressure at plot 406, and canister load at plot 412. In response to increases in the fuel tank pressure, a FTIV (FTIV 52 shown in FIG. 1) may be opened to relieve fuel tank pressure, and route a portion of fuel vapors in the fuel tank to a fuel vapor storage canister (e.g., canister 22) via a fuel vapor storage line (storage line 78 shown in FIG. 1). Changes in the position of the FTIV are shown at plot 407. A threshold 413, is shown, where for fuel vapor levels in the canister above the threshold 413, purging of the canister may be desired. Further, graph 400 shows changes in canister hydrocarbon bleedthrough at plot 408, and fuel fill inlet hydrocarbon bleedthrough at plot 410. Thus, the plot at 408 depicts levels of hydrocarbons that may escape to the atmosphere from a canister through a vent line (e.g., vent line 27 shown in FIG. 1). Similarly, the plot at 410 depicts changes in the levels of hydrocarbons that may escape to the atmosphere from the fuel tank via a fuel fill inlet (e.g., fuel fill inlet 19 shown in FIG. 1). Graph 400 also shows changes in the position of a fuel vapor recirculation valve (e.g., variable orifice valve 54 shown in FIG. 1) at plot 414.

As described above with reference to FIG. 3, the recirculation valve may be adjusted based on the hydrocarbon emissions levels from the canister and the fuel fill inlet. Additionally the recirculation valve may be opened in response to increases in the fuel tank pressure by more than a threshold while the fuel level is below a threshold.

Engine speed may be estimated based on outputs from one or more sensors configured to measure engine speed, such as a crankshaft position sensor. Fuel level may be estimated based on outputs from a fuel level sensor (e.g., fuel level sensor 34 shown in FIG. 1). The fuel tank pressure may be estimated by a FTPT sensor (e.g., FTPT sensor 91 shown in FIG. 1), and the canister load may be estimated based on output from a temperature sensor coupled to the canister (e.g., sensor 32 shown in FIG. 1). Hydrocarbon emission level from the canister may be estimated by a first hydrocarbon sensor positioned in the vent line between the canister and the atmosphere (e.g., first hydrocarbon sensor 57 shown in FIG. 1). Hydrocarbon emission levels from the fuel fill inlet may be estimated by a second hydrocarbon sensor position in the fuel fill inlet between the recirculation line and the atmosphere (e.g., second hydrocarbon sensor 55 shown in FIG. 1).

Starting at t0, the engine speed (plot 402) may be decreasing. As such, a vehicle system (e.g. vehicle system 6 shown in FIG. 1) in which the engine (e.g., engine system 8 shown in FIG. 1) is incorporated may be coming to a stop. The fuel level (plot 404) may be at approximately a lower first level, F1. The canister load (plot 412) may be below the threshold 413, and as such purging of the canister may not be desired. Fuel pressures (plot 406) may be at approximately a lower first level P1, and as such the FTIV (plot 407) may be maintained in a closed position. Thus, fuel vapors may not flow from the fuel tank to the canister. As such the position of the fuel vapor recirculation valve (plot 414) may be maintained at t0. Specifically, the fuel vapor recirculation valve may be maintained in a relatively closed position. Hydrocarbon emission levels from the canister (plot 408) and from the fuel fill inlet (plot 410) may be at relatively low levels since the canister load is below the threshold 413, and fuel tank pressures are at the lower first level P1.

Between t0 and t1, the engine speed may continue to decrease down to approximately zero where it is at a stop. As such, the vehicle system may be coming to a stop. The fuel level may be at approximately a lower first level, F1. The canister load may be below the threshold 413, and as such purging of the canister may not be desired. Fuel pressures may continue to fluctuate around the lower first level P1, and as such the FTIV may continue to be maintained in a closed position. Thus, fuel vapors may not flow from the fuel tank to the canister. As such the position of the fuel vapor recirculation valve may be maintained between t0 and t1. Specifically, the fuel vapor recirculation valve may be maintained in a relatively closed position. Hydrocarbon emission levels from the canister and from the fuel fill inlet may be at relatively low levels since the canister load is below the threshold 413, and fuel tank pressures are at the lower first level P1.

At t1, the engine speed may reach approximately zero, and as such the engine may be turned off at t1. The fuel level may be at approximately the lower first level, F1. The canister load may be below the threshold 413, and as such purging of the canister may not be desired. Fuel pressures may continue to fluctuate around the lower first level P1, and as such the FTIV may continue to be maintained in a closed position. Thus, fuel vapors may not flow from the fuel tank to the canister. As such the position of the fuel vapor recirculation valve may be maintained at t1. Specifically, the fuel vapor recirculation valve may be maintained in a relatively closed position. Hydrocarbon emission levels from the canister and from the fuel fill inlet may be at relatively low levels since the canister load is below the threshold 413, and fuel tank pressures are at the lower first level P1.

Between t1 and t2 the engine may be off, and the fuel level may remain at approximately the lower first level, F1. The canister load may be below the threshold 413. Fuel pressures may continue to fluctuate around the lower first level P1, and as such the FTIV may continue to be maintained in a closed position. Thus, fuel vapors may not flow from the fuel tank to the canister. As such the position of the fuel vapor recirculation valve may be maintained between t1 and t2. Specifically, the fuel vapor recirculation valve may be maintained in a relatively closed position. Hydrocarbon emission levels from the canister and from the fuel fill inlet may be at relatively low levels since the canister load is below the threshold 413, and fuel tank pressures are at the lower first level P1.

At t2 a fueling event may commence. Thus, fuel may begin to be added to the fuel tank, and therefore the fuel level begins to increase from F1 at t2. Correspondingly, the fuel tank pressure starts to increase from P1 at t2. In response to the increase in fuel tank pressure, the FTIV may be adjusted towards a more open position at t2. Due to the opening of the FTIV and subsequent flow of fuel vapors from the fuel tank to the canister, the canister load may start to increase at t2. In response to the initiation of the fueling event at t2 and/or opening of the FTIV, the fuel vapor recirculation valve may be adjusted to a calibrated first position, such as the calibrated first position described above with reference to FIG. 3. Further, the hydrocarbon emission level from the fuel fill inlet and the canister may continue to remain at relatively lower levels.

Between t2 and t3 the fueling event may continue, and as such the fuel level in the fuel tank may continue to increase. The engine may remain off and thus the engine speed may be zero. Due to the increase in fuel levels, the fuel tank pressure may continue to increase. Further, the FTIV may be maintained in an open position. Due to the opening of the FTIV and subsequent flow of fuel vapors from the fuel tank to the canister, the canister load may continue to increase between t2 and t3. The fuel vapor recirculation valve may be maintained in the calibrated first position as the emission of hydrocarbons from the fuel fill inlet and the canister may remain at relatively low levels.

At t3 emissions of hydrocarbons to the atmosphere from the canister may begin to increase. In response to the increase in canister hydrocarbon bleedthrough, the recirculation valve may be adjusted towards a more open position, to increase an amount of fuel vapors flowing through the recirculation line relative to the storage line and canister. Thus, at t3, the ratio of fuel vapors flowing through the recirculation line relative to the storage line may be increased. As such, the amount of fuel vapors flowing to the canister may be reduced. In response to the reduction in fuel vapor flow to the canister at t3, the canister load may begin to level off at t3. Fuel may continue to be added to the fuel tank, and therefore the fuel level continues to increase. Correspondingly, the fuel tank pressure may also continue to increase. Further, the hydrocarbon emission level from the fuel fill inlet may remain relatively low, and may not increase at t3.

Between t3 and t4 the fueling event may continue, and as such the fuel level in the fuel tank may continue to increase. The engine may remain off and thus the engine speed may be zero. Due to the increase in fuel levels, the fuel tank pressure may continue to increase. Further, the FTIV may be maintained in an open position. The vapor recirculation valve may be maintained in the same position as at t3, which may be more open than the calibrated first position. Due to the opening the recirculation valve, the canister loading may remain at relatively the same level as at t3. In response to the opening of the recirculation valve, the amount of hydrocarbons emitted from the canister to the atmosphere may begin to decrease between t2 and t3. The emissions of hydrocarbons from the fuel fill inlet may remain at the relatively low level as before t3.

At t4, the fueling event may continue, and as such the fuel level in the fuel tank may continue to increase. The engine may remain off and thus the engine speed may be zero. Due to the increase in fuel levels, and opening of the FTIV, the fuel tank pressure may fluctuate around a higher second level. Further, the FTIV may be maintained in an open position. The hydrocarbon emission levels from the fuel fill inlet may begin to increase at t4, and in response to the increase in emission levels from the fuel fill inlet, the recirculation valve may be adjusted to a more closed position from the position of the valve between t3 and t4. Due to the closing of the recirculation valve, the amount of fuel vapors flowing to the canister may increase, and therefore the canister load may start to increase at t4. At t4, the hydrocarbon emission levels from the canister may be reduced to the lower levels as before t3 due to the opening of the recirculation valve between t3 and t4.

Between t4 and t4 the fueling event may continue, and as such the fuel level in the fuel tank may continue to increase. The engine may remain off and thus the engine speed may be zero. Due to the increase in fuel levels, and continued opening of the FTIV, the fuel tank pressure may fluctuate around the higher second level. The vapor recirculation valve may be maintained in the same position as at t4, which may be more closed than the position of the valve between t3 and t4. Due to the opening the recirculation valve, the canister loading may remain at relatively the same level as at t3. Due to the closing of the recirculation valve, the amount of fuel vapors flowing to the canister may continue to increase, and therefore the canister load may continue to increase above the threshold 413 between t4 and t5. Between t4 and t5, the hydrocarbon emission levels from the fuel fill inlet may decrease and return to the lower levels similar to before t4 due to the closing of the recirculation valve. The hydrocarbon emission levels from the canister may continue to fluctuate around lower levels similar to before t3.

At t5, the hydrocarbon emission levels from the canister and the fuel fill inlet may be at the lower levels similar to that before t3. Thus, the recirculation valve may be adjusted back to the calibrated first position, R1, at t5. The canister load may continue to increase at t5, as the FTIV is maintained open. The FTIV may be maintained open at t5, as the fueling event may continue at t5, as the fuel level continues to increase. Similarly, the fuel tank pressure may continue to fluctuate around the higher level similar to between t4 and t5. Thus, the engine may remain off at t5.

Between t5 and t6, the hydrocarbon emission levels from the canister and the fuel fill inlet may be at the lower levels similar to that before t3. Thus, the recirculation valve may be maintained at the calibrated first position, R1. The canister load may continue to increase, as the FTIV is maintained open. The FTIV may be maintained open, as the fueling event may continue at t5, as the fuel level continues to increase. Similarly, the fuel tank pressure may continue to fluctuate around the higher level similar to between t4 and t5. Thus, the engine may remain off at t5.

At t6, the fueling event may terminate, and thus the fuel level may cease increasing at t6. The engine may remain off. The FTIV may remain open at t6, and in response to the termination of the fueling event and opening of the FTIV, the fuel tank pressure may begin to decrease at t6. The hydrocarbon emission levels from the canister and the fuel fill inlet may be at the lower levels similar to that before t3. As such, the recirculation valve may be maintained in the calibrated first position. Due to the FTIV remaining open, the canister load may continue to increase.

Between t6 and t7, the engine may remain off, and the fuel level may remain approximately the same, as the fuel tank is not being fueled. The FTIV may remain open, and in response to the termination of the fueling event and opening of the FTIV, the fuel tank pressure may continue to decrease between t6 and t7. The hydrocarbon emission levels from the canister and the fuel fill inlet may be at the lower levels similar to that before t3. As such, the recirculation valve may be maintained in the calibrated first position. Due to the FTIV remaining open, the canister load may continue to increase.

At t7, the engine may be turned on, and the engine speed may increase from approximately zero. However, since the fuel tank pressure may be relatively high at t7, the FTIV may remain open, and fuel vapors may continue to flow to the canister. The canister load therefore may continue to increase at t7. The hydrocarbon emission levels from the canister and the fuel fill inlet may be at the lower levels similar to that before t3. As such, the recirculation valve may be maintained in the calibrated first position.

Between t7 and t8, the engine speed may continue to increase and as the engine is supplied with fuel, the fuel level may begin to decrease. Additionally, the fuel tank pressure may continue to decrease, and in response to the decrease in fuel tank pressure, the FTIV may be closed. The canister load therefore fluctuate around the level as at t7. The hydrocarbon emission levels from the canister and the fuel fill inlet may be at the lower levels similar to that before t3. As such, the recirculation valve may be maintained in the calibrated first position.

At t8, a canister purging event may commence. As such, the FTIV may be maintained in the closed position. Due to the purging operation, the canister loading may begin to decrease. Further, as more fuel is consumed by the engine as its speed increases, the fuel tank pressure may continue to decrease. The recirculation valve may be maintained in the calibrated first position. Further the hydrocarbon emission levels from the canister and the fuel fill inlet may be at the lower levels similar to that before t3, as fuel vapors may not be exiting the fuel tank at t8.

Between t8 and t9, canister purging may continue, and as a result, the canister load may continue to decrease. The hydrocarbon emissions from the fuel fill inlet and the canister may remain at relatively low levels similar to before t3. As such, the recirculation valve may be maintained in the calibrated first position. Further, the FTIV may be closed, as the fuel tank pressure may remain relatively low. The engine may continue to run between t8 and t9, and as such the fuel level may continue to decrease.

At t9, the engine speed may reach approximately zero, and as such the engine may be turned off at t9. The fuel level may reach approximately the lower first level, F1. The canister load may be below the threshold 413, and as such purging of the canister may not be desired. Fuel pressures may continue to fluctuate around the lower first level P1, and as such the FTIV may continue to be maintained in a closed position. Thus, fuel vapors may not flow from the fuel tank to the canister. As such the position of the fuel vapor recirculation valve may be maintained in the calibrated first position at t9. Hydrocarbon emission levels from the canister and from the fuel fill inlet may be at relatively low levels since the canister load is below the threshold 413, and fuel tank pressures are at the lower first level P1.

Between t9 and t10 the engine may be off, and the fuel level may remain at approximately the lower first level, F1. The canister load may be below the threshold 413. Fuel pressures may continue to fluctuate around the lower first level P1, and as such the FTIV may continue to be maintained in a closed position. Thus, fuel vapors may not flow from the fuel tank to the canister. As such the position of the fuel vapor recirculation valve may be maintained in the calibrated first position between t9 and t10. Hydrocarbon emission levels from the canister and from the fuel fill inlet may be at relatively low levels since the canister load is below the threshold 413, and fuel tank pressures are at the lower first level P1.

At t10 a fueling event may commence. Thus, fuel may begin to be added to the fuel tank, and therefore the fuel level begins to increase from F1 at t2. Correspondingly, the fuel tank pressure starts to increase from P1 at t2. In response to the increase in fuel tank pressure, the FTIV may be adjusted towards a more open position at t2. Due to the opening of the FTIV and subsequent flow of fuel vapors from the fuel tank to the canister, the canister load may start to increase at t2. In response to the initiation of the fueling event at t2 and/or opening of the FTIV, the fuel vapor recirculation valve may be maintained at the calibrated first position. Further, the hydrocarbon emission levels from the fuel fill inlet may continue to remain at relatively lower levels. However, the hydrocarbon emission levels from the canister may begin to increase at t10.

In response to the increase in canister hydrocarbon bleedthrough, the recirculation valve may be adjusted from the calibrated first position to a more open position between t10 and t11. Between t10 and t11 the fueling event may continue, and as such the fuel level in the fuel tank may continue to increase. The engine may remain off and thus the engine speed may be zero. Due to the increase in fuel levels, the fuel tank pressure may continue to increase. Further, the FTIV may be maintained in an open position. Due to the opening of the FTIV and subsequent flow of fuel vapors from the fuel tank to the canister, the canister load may continue to increase between t2 and t3. The emission of hydrocarbons from the fuel fill inlet may remain at relatively low levels.

At t11 the fuel tank pressure may increase by more than a threshold rate of increase, and in response to the increase in fuel tank pressure, the recirculation valve may be adjusted to a more open position, than the position between t10 and t11. In response to the opening of the recirculation valve, the amount of increase in the canister loading may decrease. Due to the opening of the recirculation valve, the hydrocarbon emissions from the canister may begin to fall back to lower levels similar to that before t3. The fueling event may continue, and as such the fuel level in the fuel tank may continue to increase. The engine may remain off and thus the engine speed may be zero. Further, the FTIV may be maintained in an open position.

Between t11 and t12, the fuel tank pressure may begin to level off, due to the opening of the fuel vapor recirculation valve. Thus the fuel vapor recirculation valve may be held in the more open position than between t10 and t11. The canister load may continue to increase due to the continued flow fuel vapors to the canister from the open FTIV. The fueling event may continue and the engine may remain off.

At t12, the fuel fill inlet hydrocarbon bleedthrough levels may increase, and in response to the increase, the recirculation valve may be adjusted from the position between t11 and t12 to a more closed position at t12. The fueling event may continue and the engine may remain off. The canister load may continue to increase as the FTIV may be maintained open during the fueling event, as fuel tank pressures, may continue to fluctuate around the higher second level. Hydrocarbon emission levels from the canister may remain at relatively low levels similar to that before t3.

Between t12 and t13 the recirculation valve may be maintained in the more closed position relative to the position between t11 and t12, and as such the hydrocarbon emission from the fuel fill inlet may begin to decrease. The fueling event may continue and the engine may remain off. The canister load may continue to increase as the FTIV may be maintained open during the fueling event, as fuel tank pressures, may continue to fluctuate around the higher second level. Hydrocarbon emission levels from the canister may remain at relatively low levels similar to that before t3.

At t13, the hydrocarbon emission levels from the fuel fill inlet may return to the lower levels similar to before t3, and in response to the reduction in hydrocarbon emission from the fuel fill inlet, the recirculation valve may be adjusted back to the calibrated first position. Further, the fueling event may terminate at t13, and as such fuel levels may remain around an upper second level F2. The FTIV may be closed at t13 as, the fuel tank pressure may be decreasing, and the tank is no longer receiving fuel. Hydrocarbon emission levels from the canister may remain at relatively low levels similar to that before t3.

After t13, the hydrocarbon emission levels from the fuel fill inlet may remain at the lower levels similar to before t3, and the recirculation valve may be maintained at the calibrated first position. Further, the engine may be off and as such fuel levels may remain around the upper second level F2. The FTIV may remain closed as the fuel tank pressure may be decreasing, and the tank is no longer receiving fuel. Hydrocarbon emission levels from the canister may remain at relatively low levels similar to that before t3.

In this way, hydrocarbons emissions from a fuel system and/or EVAP system may be reduced. In response to increases in hydrocarbon emissions from a vent line coupled to a canister of the EVAP system, a variable orifice valve positioned in a recirculation line coupled to a fuel tank, and fuel filler inlet may be adjusted to a more open position. Opening the recirculation valve, may allow a greater portion of the fuel vapors exiting the fuel tank to flow through the recirculation line, and therefore a smaller portion to the canister. In this way, canister loading rates may be reduced, and therefore bleedthrough emissions from the canister may be minimized. Conversely, if hydrocarbon emissions from the fuel fill inlet increase, the valve may be adjusted to a more closed position to restrict the flow of fuel vapors through the recirculation line, to reduce emissions from the fuel fill inlet. Further, the valve may be adjusted to a more open position in response to increases in the fuel tank pressure by more than a threshold, when the fuel level is less than a threshold. By opening the recirculation line, increases in the fuel tank pressure may be mitigated, and as such premature fuel shut-off events during fuel tank refueling may be reduced.

Thus, a technical effect of reducing canister size is achieved by providing the variable orifice valve in the recirculation line. By adjusting the valve to more open position in response to increases in hydrocarbon emissions from the canister, and to a more closed position in response to increases in hydrocarbon emission from the fuel fill inlet, fuel vapor flow rates to the canister may be reduced, while maintaining and/or reducing emission levels. Reducing the size of the canister may result in decreased packaging size, decreased cost, and improved fuel efficiency. Further a technical effect of reducing premature fuel shut offs during fuel tank refueling is achieved by opening the recirculation valve in response to fuel tank pressure spikes while the fuel level is below a threshold. By opening the valve, and reducing the magnitude of increases in the fuel tank pressure while the fuel tank is not full, premature fuel shut-offs may be reduced.

As one embodiment, a method for an engine may comprise, adjusting an amount of fuel vapors flowing through a fuel vapor recirculation line, the line coupled on a first end to a fuel tank and on an opposite second end to a fuel fill inlet, by adjusting a position of a variable orifice valve positioned within the recirculation line, via an electronic controller. The adjusting may be based on one or more of a fuel tank pressure, canister loading, fuel dispense rate, a first hydrocarbon emission level from a fresh air vent coupled to a fuel vapor canister, and a second hydrocarbon emissions level from the fuel fill inlet. In some examples, the fuel tank pressure, fuel dispense rate, and fuel level may be estimated based on outputs from a pressure sensor coupled between the fuel tank and the canister, and configured to measure a pressure in said fuel tank. Further in some examples, the first hydrocarbon emission level may be estimated based on outputs from a first hydrocarbon sensor positioned in the fresh air vent, and where the second hydrocarbon emission level may be estimated based on outputs from a second hydrocarbon sensor positioned in the fuel fill inlet. The fuel fill inlet may be configured to receive fuel from a fuel source, and deliver said fuel to the fuel tank. Additionally or alternatively, the adjusting the position of the valve may comprise opening the valve in response to increases in hydrocarbon emissions from a carbon canister, and closing the valve in response to increases in hydrocarbon emissions from the fuel fill inlet. The position of the valve may be adjusted to a more open position in response to increases in the fuel tank pressure by more than a threshold rate when a fuel level in the tank is less than a threshold.

As another embodiment, a method may comprise adjusting a ratio of fuel vapors flowing through a fuel vapor recirculation line relative to a fuel vapor storage line by adjusting the position of a continuously variable valve positioned in the fuel vapor recirculation line, where the adjusting may be based on hydrocarbon emission levels from a fuel vapor canister vent line, and hydrocarbon emission levels from a fuel fill inlet of a fuel tank. The ratio may be increased by adjusting the valve to a more open position in response to increases in the hydrocarbon emission levels from the vent line, and wherein the ratio may be decreased by adjusting the valve to a more closed position in response to increases in the hydrocarbon emission levels from the fuel fill inlet. In some examples, the amount that the valve is opened may be proportional to the amount of increase in the hydrocarbon emission levels from the vent line, and the amount that the valve is closed may be proportional to the amount of increase in the hydrocarbon emission levels from the fuel fill inlet. In further examples, the adjusting of the valve may be performed by an electromechanical actuator of the valve in response to signals received from a controller. In some examples the method may further comprise opening a fuel tank isolation valve in response to a pressure in the fuel tank exceeding a threshold, and flowing fuel vapors from the fuel tank to a fuel vapor canister. The pressure in the fuel tank may be estimated based on outputs from a pressure sensor coupled between the fuel tank and the fuel tank isolation valve. Additionally or alternatively, the method may comprise opening one or more vent valves coupled to the fuel tank, and flowing a portion of fuel vapors from the fuel tank through the recirculation line during a refueling event. The ratio of fuel vapors flowing through the recirculation line relative to the storage line may increased by adjusting the valve to a more open position in response to an increase in a pressure in the fuel tank by more than a threshold during a refueling event where a fuel level in the fuel tank is less than a threshold.

In still further embodiments, a system may comprise a fuel tank, a fuel fill inlet coupled to the fuel tank and configured to receive a fuel dispensing mechanism for supplying fuel to the fuel tank, a recirculation line coupled on a first end to the fuel tank, and on an opposite second end to the fill inlet, the recirculation line comprising a variable orifice valve, a fuel vapor canister, a vent line coupled on a first end to the canister, and open on an opposite second end to ambient air, and a controller with computer readable instructions for adjusting the position of the variable orifice valve based on hydrocarbon emission levels from one or more of the fuel fill inlet and the vent line. The system may in some examples additionally include a first hydrocarbon sensor positioned within the vent line and configured to measure an amount of hydrocarbons exiting the vent line to the atmosphere. The system may additionally include a second hydrocarbon sensor positioned within the fuel fill inlet and configured to measure an amount of hydrocarbons exiting the fuel fill inlet to the atmosphere. In some examples, the system may include both the first and second hydrocarbon sensors. In some examples, the system may include a fuel tank isolation valve positioned between the fuel tank and the fuel vapor canister for regulating an amount of fuel vapors flowing from the fuel tank to the fuel vapor canister, where the valve is opened in response to a pressure in the fuel tank increasing above a threshold. The variable orifice valve may comprise an orifice formed by a flow restriction of the valve, where an amount of gasses flowing through the orifice may be adjusted by adjusting a position of the flow restriction, and where the position of the flow restriction may be adjusted by an electromechanical actuator coupled to the flow restriction.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a fuel tank;
a fuel fill inlet coupled to the fuel tank and configured to receive a fuel dispensing mechanism for supplying fuel to the fuel tank;
a recirculation line coupled on a first end to the fuel tank, and on an opposite second end to the fill inlet, the recirculation line comprising a variable orifice valve;
a fuel vapor canister;
a vent line coupled on a first end to the canister, and open on an opposite second end to ambient air; and
a controller with computer readable instructions for:
adjusting the position of the variable orifice valve based on hydrocarbon emission levels from one or more of the fuel fill inlet and the vent line.

2. The system of claim 1, further comprising a first hydrocarbon sensor positioned within the vent line and configured to measure an amount of hydrocarbons exiting the vent line to the atmosphere.

3. The system of claim 1, further comprising a second hydrocarbon sensor positioned within the fuel fill inlet and configured to measure an amount of hydrocarbons exiting the fuel fill inlet to the atmosphere.

4. The system of claim 1, further comprising a fuel tank isolation valve positioned between the fuel tank and the fuel vapor canister for regulating an amount of fuel vapors flowing from the fuel tank to the fuel vapor canister, where the valve is opened in response to a pressure in the fuel tank increasing above a threshold.

5. The system of claim 1, wherein the variable orifice valve comprises an orifice formed by a flow restriction of the valve, where an amount of gasses flowing through the orifice may be adjusted by adjusting a position of the flow restriction, and where the position of the flow restriction may be adjusted by an electromechanical actuator coupled to the flow restriction.

6. A method for an engine comprising:
adjusting an amount of fuel vapors flowing through a fuel vapor recirculation line, the line coupled on a first end to a fuel tank and on an opposite second end to a fuel fill inlet, by adjusting a position of a variable orifice valve positioned within the recirculation line, via an electronic controller.

7. The method of claim 6, wherein the adjusting is based on one or more of a fuel tank pressure, canister loading, fuel dispense rate, a first hydrocarbon emission level from a fresh air vent coupled to a fuel vapor canister, and a second hydrocarbon emissions level from the fuel fill inlet.

8. The method of claim 7, wherein the fuel tank pressure, fuel dispense rate, and fuel level are estimated based on outputs from a pressure sensor coupled between the fuel tank and the canister, and configured to measure a pressure in said fuel tank.

9. The method of claim 7, where the first hydrocarbon emission level is estimated based on outputs from a first hydrocarbon sensor positioned in the fresh air vent, and where the second hydrocarbon emission level is estimated based on outputs from a second hydrocarbon sensor positioned in the fuel fill inlet.

10. The method of 6, wherein the fuel fill inlet is configured to receive fuel from a fuel source, and deliver said fuel to the fuel tank.

11. The method of claim 6, wherein the adjusting the position of the valve comprises opening the valve in response to increases in hydrocarbon emissions from a carbon canister, and closing the valve in response to increases in hydrocarbon emissions from the fuel fill inlet.

12. The method of claim 6, wherein the position of the valve is adjusted to a more open position in response to increases in the fuel tank pressure by more than a threshold rate when a fuel level in the tank is less than a threshold.

13. A method comprising:
adjusting a ratio of fuel vapors flowing through a fuel vapor recirculation line relative to a fuel vapor storage line by adjusting the position of a continuously variable valve positioned in the fuel vapor recirculation line, where the adjusting is based on hydrocarbon emission levels from a fuel vapor canister vent line, and hydrocarbon emission levels from a fuel fill inlet of a fuel tank.

14. The method of claim 13, wherein the ratio is increased by adjusting the valve to a more open position in response to increases in the hydrocarbon emission levels from the vent line, and wherein the ratio is decreased by adjusting the valve to a more closed position in response to increases in the hydrocarbon emission levels from the fuel fill inlet.

15. The method of claim 14, wherein the amount that the valve is opened is proportional to the amount of increase in the hydrocarbon emission levels from the vent line, and the amount that the valve is closed is proportional to the amount of increase in the hydrocarbon emission levels from the fuel fill inlet.

16. The method of claim 13, wherein the adjusting of the valve is performed by an electromechanical actuator of the valve in response to signals received from a controller.

17. The method of claim 13, further comprising opening a fuel tank isolation valve in response to a pressure in the fuel tank exceeding a threshold, and flowing fuel vapors from the fuel tank to a fuel vapor canister.

18. The method of claim 17, wherein the pressure in the fuel tank is estimated based on outputs from a pressure sensor coupled between the fuel tank and the fuel tank isolation valve.

19. The method of claim 13, further comprising opening one or more vent valves coupled to the fuel tank, and flowing a portion of fuel vapors from the fuel tank through the recirculation line during a refueling event.

20. The method of claim 13, wherein the ratio of fuel vapors flowing through the recirculation line relative to the storage line is increased by adjusting the valve to a more open position in response to an increase in a pressure in the fuel tank by more than a threshold during a refueling event where a fuel level in the fuel tank is less than a threshold.

* * * * *